(12) United States Patent
Khan

(10) Patent No.: US 12,169,830 B2
(45) Date of Patent: Dec. 17, 2024

(54) CREATING AND MANAGING ARTIFICIALLY INTELLIGENT ENTITIES REPRESENTED BY NON-FUNGIBLE TOKENS ON A BLOCKCHAIN

(71) Applicant: Arif Khan, San Francisco, CA (US)

(72) Inventor: Arif Khan, San Francisco, CA (US)

(*) Notice: Subject to any disclaimer, the term of this patent is extended or adjusted under 35 U.S.C. 154(b) by 0 days.

(21) Appl. No.: 18/053,131

(22) Filed: Nov. 7, 2022

(65) Prior Publication Data

US 2023/0289784 A1 Sep. 14, 2023

Related U.S. Application Data

(63) Continuation of application No. 17/573,173, filed on Jan. 11, 2022, now Pat. No. 11,521,200.

(Continued)

(51) Int. Cl.
*G06Q 20/38* (2012.01)
*G06Q 20/06* (2012.01)
(Continued)

(52) U.S. Cl.
CPC ..... *G06Q 20/38215* (2013.01); *G06Q 20/065* (2013.01); *G06Q 20/223* (2013.01);
(Continued)

(58) Field of Classification Search
CPC ........... G06Q 20/38215; G06Q 20/065; G06Q 20/223; G06Q 20/36; G06Q 20/367;
(Continued)

(56) References Cited

U.S. PATENT DOCUMENTS 5,892,900 A 4/1999 Ginter et al.
6,640,304 B2 10/2003 Ginter et al.
(Continued)

FOREIGN PATENT DOCUMENTS

KR 20200048170 A 5/2020
WO WO-2015108482 A1 * 7/2015 ......... G06Q 30/0222
(Continued)

OTHER PUBLICATIONS

Ponomarev, Voronkov, Multi-agent systems and decentralized artificial superintelligence, 2017, arXiv:1702.08529, entire (Year: 2017).*

(Continued)

*Primary Examiner* — Patrick McAtee
*Assistant Examiner* — Nakia Leffall-Allen
(74) *Attorney, Agent, or Firm* — Kilpatrick Townsend & Stockton LLP

(57) ABSTRACT

Some examples of the present disclosure relate to generating artificially intelligent entities represented on a blockchain using a non-fungible token (NFT). In one such example, a system can generate an NFT on a blockchain. The NFT can represent an artificially intelligent entity. The system can also generate a personality dataset on the blockchain, the personality dataset describing personality characteristics of the artificially intelligent entity. The system can then correlate the NFT to the personality dataset, thereby assigning the personality characteristics to the artificially intelligent entity. Once generated, the artificially intelligent entity may reside in a virtual ecosystem in which it can perform tasks and learn over time.

17 Claims, 14 Drawing Sheets

Related U.S. Application Data

(60) Provisional application No. 63/262,236, filed on Oct. 7, 2021, provisional application No. 63/240,798, filed on Sep. 3, 2021.

(51) Int. Cl.
*G06Q 20/22* (2012.01)
*G06Q 20/36* (2012.01)
*G06Q 30/0207* (2023.01)
*H04L 9/32* (2006.01)
*H04L 9/00* (2022.01)

(52) U.S. Cl.
CPC .......... *G06Q 20/36* (2013.01); *G06Q 20/367* (2013.01); *G06Q 20/3672* (2013.01); *G06Q 30/0209* (2013.01); *H04L 9/3213* (2013.01); *G06Q 2220/00* (2013.01); *H04L 9/50* (2022.05); *H04L 2209/56* (2013.01); *H04L 2209/603* (2013.01)

(58) Field of Classification Search
CPC .......... G06Q 20/3672; G06Q 30/0209; G06Q 2220/00; H04L 9/3213; H04L 9/50; H04L 2209/56; H04L 2209/603
See application file for complete search history.

(56) References Cited

U.S. PATENT DOCUMENTS

| | | | |
|---|---|---|---|
| 10,715,329 B1 * | 7/2020 | Wellman | H04L 63/0861 |
| 10,832,522 B2 | 11/2020 | Simons | |
| 11,075,891 B1 * | 7/2021 | Long | H04L 9/3239 |
| 11,334,876 B2 | 5/2022 | Yantis et al. | |
| 11,355,098 B1 * | 6/2022 | Zhong | G10L 15/22 |
| 11,461,774 B1 | 10/2022 | Khan | |
| 11,494,760 B1 | 11/2022 | Khan | |
| 11,496,308 B1 | 11/2022 | Khan | |
| 11,521,200 B1 * | 12/2022 | Khan | G06Q 20/36 |
| 2019/0080407 A1 | 3/2019 | Molinari et al. | |
| 2019/0221076 A1 | 7/2019 | Simons | |
| 2020/0005284 A1 * | 1/2020 | Vijayan | H04L 9/3247 |
| 2020/0035060 A1 | 1/2020 | Shigeta | |
| 2020/0213121 A1 | 7/2020 | Hioki | |
| 2020/0225655 A1 | 7/2020 | Cella et al. | |
| 2020/0273048 A1 * | 8/2020 | Andon | G06Q 20/045 |
| 2020/0311721 A1 * | 10/2020 | Ow | G06Q 20/02 |
| 2020/0348662 A1 | 11/2020 | Cella et al. | |
| 2020/0364588 A1 | 11/2020 | Knox | |
| 2020/0388108 A1 | 12/2020 | Simons et al. | |
| 2020/0396065 A1 | 12/2020 | Gutierrez-Sheris | |
| 2021/0012332 A1 * | 1/2021 | Ow | G06Q 20/3678 |
| 2021/0049652 A1 | 2/2021 | Brown | |
| 2021/0090449 A1 | 3/2021 | Smith et al. | |
| 2021/0118085 A1 | 4/2021 | Bushnell et al. | |
| 2021/0157312 A1 | 5/2021 | Cella et al. | |
| 2021/0182020 A1 * | 6/2021 | Kanuganti | G06F 3/167 |
| 2021/0202067 A1 * | 7/2021 | Williams | G06Q 50/265 |
| 2021/0233108 A1 | 7/2021 | Gouneili | |
| 2021/0256070 A1 * | 8/2021 | Tran | G06F 16/90332 |
| 2021/0281410 A1 * | 9/2021 | Hain | G06Q 20/065 |
| 2021/0295324 A1 * | 9/2021 | Kerseboom | H04L 9/3239 |
| 2021/0319436 A1 * | 10/2021 | Ow | G06Q 20/0658 |
| 2022/0027447 A1 * | 1/2022 | Keith, Jr. | G06F 21/32 |
| 2022/0044334 A1 | 2/2022 | Blaikie, III et al. | |
| 2022/0058633 A1 * | 2/2022 | Yantis | G06Q 20/3676 |
| 2022/0067705 A1 * | 3/2022 | Yantis | G06Q 20/40 |
| 2022/0069996 A1 | 3/2022 | Xue et al. | |
| 2022/0108262 A1 | 4/2022 | Cella et al. | |
| 2022/0116415 A1 | 4/2022 | Burgis et al. | |
| 2023/0088446 A1 * | 3/2023 | Rittman | G06Q 30/018 713/176 |
| 2023/0289817 A1 * | 9/2023 | Ashby | H04L 9/3271 |

FOREIGN PATENT DOCUMENTS

| | | |
|---|---|---|
| WO | 2020010159 | 1/2020 |
| WO | 2020153525 A1 | 7/2020 |
| WO | 2020158988 A1 | 8/2020 |
| WO | 2021002917 A2 | 1/2021 |
| WO | 2022016020 | 1/2022 |

OTHER PUBLICATIONS

U.S. Appl. No. 17/573,173, "Final Office Action", Sep. 23, 2022, 16 pages.
U.S. Appl. No. 17/573,173, "Non-Final Office Action", Mar. 22, 2022, 11 pages.
U.S. Appl. No. 17/573,173, "Non-Final Office Action", Jul. 25, 2022, 13 pages.
U.S. Appl. No. 17/573,173, "Notice of Allowance", Nov. 1, 2022, 11 pages.
U.S. Appl. No. 17/573,298, "Corrected Notice of Allowability", Aug. 31, 2022, 2 pages.
U.S. Appl. No. 17/573,298, "Non-Final Office Action", Mar. 30, 2022, 9 pages.
U.S. Appl. No. 17/573,298, "Notice of Allowance", Jul. 22, 2022, 9 pages.
U.S. Appl. No. 17/573,340, "Non-Final Office Action", May 12, 2022, 8 pages.
U.S. Appl. No. 17/573,340, "Notice of Allowance", Aug. 16, 2022, 10 pages.
U.S. Appl. No. 17/587,623, "Final Office Action", Jul. 26, 2022, 14 pages.
U.S. Appl. No. 17/587,623, "Non-Final Office Action", Apr. 11, 2022, 10 pages.
U.S. Appl. No. 17/587,623, "Notice of Allowance", Aug. 31, 2022, 15 pages.
Jeon, et al., "Blockchain and Ai Meet in the Metaverse", ResearchGate, Available Online at URL:https://www.intechopen.com/chapters/77823, Aug. 3, 2021, pp. 1-11.
PCT/US2022/074746, "International Search Report and Written Opinion", Nov. 29, 2022, 12 pages.
PCT/US2022/075565, "International Search Report and the Written Opinion", Dec. 22, 2022, 9 pages.
U.S. Appl. No. 17/959,968, "Notice of Allowance", mailed on Nov. 24, 2023, 9 pages.
International Application No. PCT/US2022/074746, International Preliminary Report on Patentability mailed on Mar. 14, 2024, 8 pages.
International Application No. PCT/US2022/075565, International Preliminary Report on Patentability mailed on Mar. 14, 2024, 6 pages.

* cited by examiner

CREATING AND MANAGING ARTIFICIALLY INTELLIGENT ENTITIES REPRESENTED BY NON-FUNGIBLE TOKENS ON A BLOCKCHAIN

REFERENCE TO RELATED APPLICATIONS

This application is a continuation of U.S. application Ser. No. 17/573,173, filed Jan. 11, 2022, which claims priority to and the benefit of U.S. Provisional Patent Application No. 63/240,798, filed Sep. 3, 2021, and to U.S. Provisional Patent Application No. 63/262,236, filed Oct. 7, 2021, the entirety of each of which is hereby incorporated by reference herein.

TECHNICAL FIELD

This application relates generally to artificially intelligent entities. More specifically, but not by way of limitation, this disclosure relates to creating and managing artificially intelligent entities represented by non-fungible tokens (NFTs) on a blockchain or other digital ledger.

BACKGROUND

A blockchain is a shared, decentralized digital ledger that can facilitate the process of recording transactions and tracking asset ownership. A blockchain contains a sequential series of immutable records referred to as "blocks." Each block is distinct from the block before it and linked to the prior block via a hashed pointer, thereby creating a sequential chain of blocks or "blockchain." The immutability of the blocks allows the blockchain to serve as a trusted record of transactions. A blockchain can be distributed across a set of nodes that each have a copy of the blockchain. When a transaction is attempted, the nodes use their own copies of the blockchain to collectively reach a consensus about the validity of transaction. These distributed consensus mechanisms can make falsifying transactions challenging and impractical, because a false transaction would be flagged by the nodes and rejected. By contrast, a traditional recordation system (such as a title recordation in real estate transactions) relies on the security and trustworthiness of a single party, which makes falsifying transactions easier.

New uses for blockchains are being developed daily. More recently, blockchains have started being used for recording and tracking ownership of unique assets, such as unique digital assets or physical assets. For example, a specific digital file, such as an image, sound file, or video, can be represented on the blockchain and the ownership thereof can be tracked over time. One way in which unique assets can be represented and tracked on the blockchain is as non-fungible tokens (NFTs). An NFT is a unique object, such as a cryptographic token, which is recorded on a digital ledger like a blockchain to represent a unique physical or digital asset. NFTs each have their own unique information and attributes, so they are not mutually interchangeable with other NFTs. This makes NFTs different from fungible assets like cryptocurrencies, in that fungible assets are identical to each other and therefore can be traded or exchanged as identical units. While a digital asset, such as an image represented by an NFT on the blockchain, may be relatively easily copied among computers with or without permission from the true owner, the NFT itself can only be transferred among owners through blockchain transactions that are validated by the blockchain network and recorded on the blockchain, providing an immutable record of true ownership.

One way of creating NFTs is through the deployment of "smart contracts" on a blockchain. A smart contract is a self-executing contract or self-enforcing agreement in the form of executable program code, which can be stored on the blockchain and executed by one more connected devices (e.g., nodes). Unlike traditional contracts, where one party may change its mind or renege on a contract, smart contracts are automatically executed in response to certain inputs or events. For example, a smart contract may enable different data structures on a blockchain to be linked to each other if certain conditions occur, such as a certain amount of currency being exchanged.

SUMMARY

In one example of this disclosure, a non-transitory computer-readable medium comprising program code executable by one or more processors may cause the processors to perform operations. Those operations may include transmitting a first command for causing a non-fungible token (NFT) to be generated on a blockchain. The NFT may represent an artificially intelligent entity. The operations may also include transmitting a second command for causing a personality dataset to be stored on the blockchain. The personality dataset may be stored on the blockchain separately from the NFT and may describe personality characteristics of the artificially intelligent entity. The operations may also include transmitting a third command to execute of a smart contract on the blockchain. The smart contract may be configured to correlate the NFT to the personality dataset and thereby assign the personality characteristics to the artificially intelligent entity.

In some examples, the personality characteristics can comprise intelligence attributes, voice attributes, psyche attributes, identity attributes, and skill attributes. The intelligence attributes can be adjustable over time, for example by using an artificial intelligence (AI) model. The AI model can be a centralized AI model that is located off the blockchain. The centralized AI model can impart artificial intelligence to a plurality of artificially intelligent entities that are represented by a plurality of NFTs on the blockchain.

In some examples, the personality dataset is stored in one or more tokens on the blockchain. In some such examples, the second command can be configured to cause the one or more tokens to be generated on the blockchain.

The smart contract can be configured to generate a correlation between the NFT and the one or more tokens to assign the personality characteristics to the artificially intelligent entity. The correlation may be stored in a record that is separate from the NFT and/or the one or more tokens. The record can be located on the blockchain or off the blockchain.

In some examples, the personality dataset for the artificially intelligent entity is updatable based on tasks performed by the artificially intelligent entity in a virtual environment.

In another example, a method is disclosed wherein a processor transmits a first command for causing an NFT to be generated on a blockchain. The NFT may represent an artificially intelligent entity. The method may also include transmitting, by the processor, a second command for causing a personality dataset to be stored on the blockchain. The personality dataset may be stored separately from the NFT.

The personality dataset may describe personality characteristics of the artificially intelligent entity. The method may also include transmitting, by the processor, a third command to execute a smart contract on the blockchain. The smart contract may be configured to correlate the NFT to the personality dataset, and thereby assign the personality characteristics to the artificially intelligent entity.

In still another example, a method is described wherein a processor generates a NFT on a blockchain. The NFT may represent an artificially intelligent entity. The processor may also generate a personality dataset on the blockchain. The personality data set may be stored on the blockchain separately from the NFT. The personality dataset may also describe the personality characteristics of the artificially intelligent entity. The processor may also execute a smart contract on the blockchain, where the smart contract is configured to correlate the NFT to the personality dataset. The correlation may result in the personality characteristics being assigned to the artificially intelligent entity.

In another example, a non-transitory computer-readable medium can include program code that is executable by one or more processors that cause the processors to perform operations. The operations may include determining that an artificially intelligent entity has performed a task in a virtual environment. The artificially intelligent entity may be associated with a digital wallet. Cryptocurrency tokens may be assigned to the digital wallet on a blockchain and may serve as intelligence units that define an intelligence level of the artificially intelligent entity. The operations may include determining an amount of cryptocurrency tokens to be awarded for performing the task. The operations may further include initiating a transfer of the amount of cryptocurrency tokens to the digital wallet in response to determining that the artificially intelligent entity has performed the task. The transfer of the cryptocurrency tokens may increase an intelligence level of the artificially intelligent entity from a first intelligence level to a second intelligence level.

In some examples, the task is a first task, the artificially intelligent entity is incapable of performing a second task in the virtual environment at the first intelligence level, and the artificially intelligent entity is capable of performing the second task in the virtual environment at the second intelligence level.

In some examples, the artificially intelligent entity is represented on the blockchain by a non-fungible token (NFT) assigned to the digital wallet.

In some examples, the task involves playing a game, completing a challenge, interacting with another artificially intelligent entity in the virtual environment, or any combination of these. Additionally or alternatively, the task can involve generating a dataset usable to further train an artificial intelligence (AI) model supporting the artificially intelligent entity.

In some examples, the intelligence level of the artificially intelligent entity is dictated by a total number of cryptocurrency tokens assigned to the digital wallet on the blockchain. For example, the artificially intelligent entity can have a higher intelligence level when there is a larger number of cryptocurrency tokens assigned to the digital wallet and a lower intelligence level when there is a smaller number of cryptocurrency tokens assigned to the digital wallet.

In some examples, the system can determine that the artificially intelligent entity has performed another task in the virtual environment; determine another amount of cryptocurrency tokens to be rescinded for performing the other task; and in response to determining that the artificially intelligent entity has performed the other task in the virtual environment, initiate another transfer of the other amount of cryptocurrency tokens from the digital wallet to another digital wallet to decrease the intelligence level of the artificially intelligent entity.

In another example, a method is described in which a processor determines that an artificially intelligent entity has performed a task in a virtual environment. The artificially intelligent entity may be associated with a digital wallet. Cryptocurrency tokens may be assigned to the digital wallet on a blockchain. The cryptocurrency tokens may also serve as intelligence units that define an intelligence level of the artificially intelligent entity. The method may also include determining, by the processor, an amount of cryptocurrency tokens to be awarded for performing the task. The method may also include the processor initiating a transfer of the amount of cryptocurrency tokens to the digital wallet in response to determining that the artificially intelligent entity has performed the task. The amount of cryptocurrency tokens transferred to the digital wallet may increase the intelligence level of the artificially intelligent entity from a first intelligence level to a second intelligence level.

In another example, a system is described that includes one or more processors communicatively coupled to a blockchain network hosting a blockchain. The system also includes a memory including program code that is executable by the one or more processors for causing the one or more processors to perform operations. The operations may include determining that an artificially intelligent entity has performed a task in a virtual environment. The artificially intelligent entity may be associated with a digital wallet. Cryptocurrency tokens may be assigned to the digital wallet on a blockchain and may serve as intelligence units that define an intelligence level of the artificially intelligent entity. The operations may include determining an amount of cryptocurrency tokens to be awarded for performing the task. The operations may further include initiating a transfer of the amount of cryptocurrency tokens to the digital wallet in response to determining that the artificially intelligent entity has performed the task. The transfer of the cryptocurrency tokens may increase an intelligence level of the artificially intelligent entity from a first intelligence level to a second intelligence level.

Some examples can involve a non-transitory computer-readable medium comprising program code that is executable by one or more processors for causing the one or more processors to perform operations including: training an artificial intelligence (AI) engine to perform a service, wherein the AI engine is configured to support to an artificially intelligent entity in a virtual environment; receiving a request from a requestor for the artificially intelligent entity to perform the service; in response to receiving the request, causing the artificially intelligent entity to perform the requested service in the virtual environment using the AI engine; determining an amount of cryptocurrency tokens to be paid in exchange for performing the requested service; and in response to determining that the artificially intelligent entity has performed the requested service in the virtual environment, initiating a transfer of the amount of cryptocurrency tokens from a first digital wallet associated with the requestor to a second digital wallet associated with the artificially intelligent entity.

In some examples, the service can involve generate an image, a video, an audio file, and/or textual content (e.g., in relation to a requested topic). The textual content may include a story, a poem, a social media post, a blog post, a book, a review, and/or an article. Additionally or alternatively, the service can involve interacting with another artificially intelligent entity in the virtual environment. The requestor of the service can be a human user of the virtual environment or another artificially intelligent entity in the virtual environment.

In some examples, the artificially intelligent entity is represented on the blockchain by a first non-fungible token (NFT) assigned to the second digital wallet. The requestor of the service may be another artificially intelligent entity represented on the same blockchain or a different blockchain by a second NFT assigned to the first digital wallet.

In another example, a method is described in which one or more processors train an artificial intelligence (AI) engine to perform a service, wherein the AI engine is configured to support to an artificially intelligent entity in a virtual environment; receive a request from a requestor for the artificially intelligent entity to perform the service; in response to receiving the request, cause the artificially intelligent entity to perform the requested service in the virtual environment using the AI engine; determine an amount of cryptocurrency tokens to be paid in exchange for performing the requested service; and in response to determining that the artificially intelligent entity has performed the requested service in the virtual environment, initiate a transfer of the amount of cryptocurrency tokens from a first digital wallet associated with the requestor to a second digital wallet associated with the artificially intelligent entity.

In another example, a system is described that includes one or more processors communicatively coupled to a blockchain network hosting a blockchain. The system also includes a memory including program code that is executable by the one or more processors for causing the one or more processors to perform operations. The operations may include training an artificial intelligence (AI) engine to perform a service, wherein the AI engine is configured to support to an artificially intelligent entity in a virtual environment; receiving a request from a requestor for the artificially intelligent entity to perform the service; in response to receiving the request, causing the artificially intelligent entity to perform the requested service in the virtual environment using the AI engine; determining an amount of cryptocurrency tokens to be paid in exchange for performing the requested service; and in response to determining that the artificially intelligent entity has performed the requested service in the virtual environment, initiating a transfer of the amount of cryptocurrency tokens from a first digital wallet associated with the requestor to a second digital wallet associated with the artificially intelligent entity.

These illustrative examples are mentioned not to limit or define the scope of this disclosure, but rather to provide examples to aid understanding thereof. It will be appreciated that examples described above may be combined with other examples described above or elsewhere herein to yield further examples. Illustrative examples are also discussed in the Detailed Description, which provides further description. Advantages offered by various examples may be further understood by examining this specification.

BRIEF DESCRIPTION OF THE DRAWINGS

Illustrative embodiments are described with reference to the following figures.

DETAILED DESCRIPTION

Figure 1:
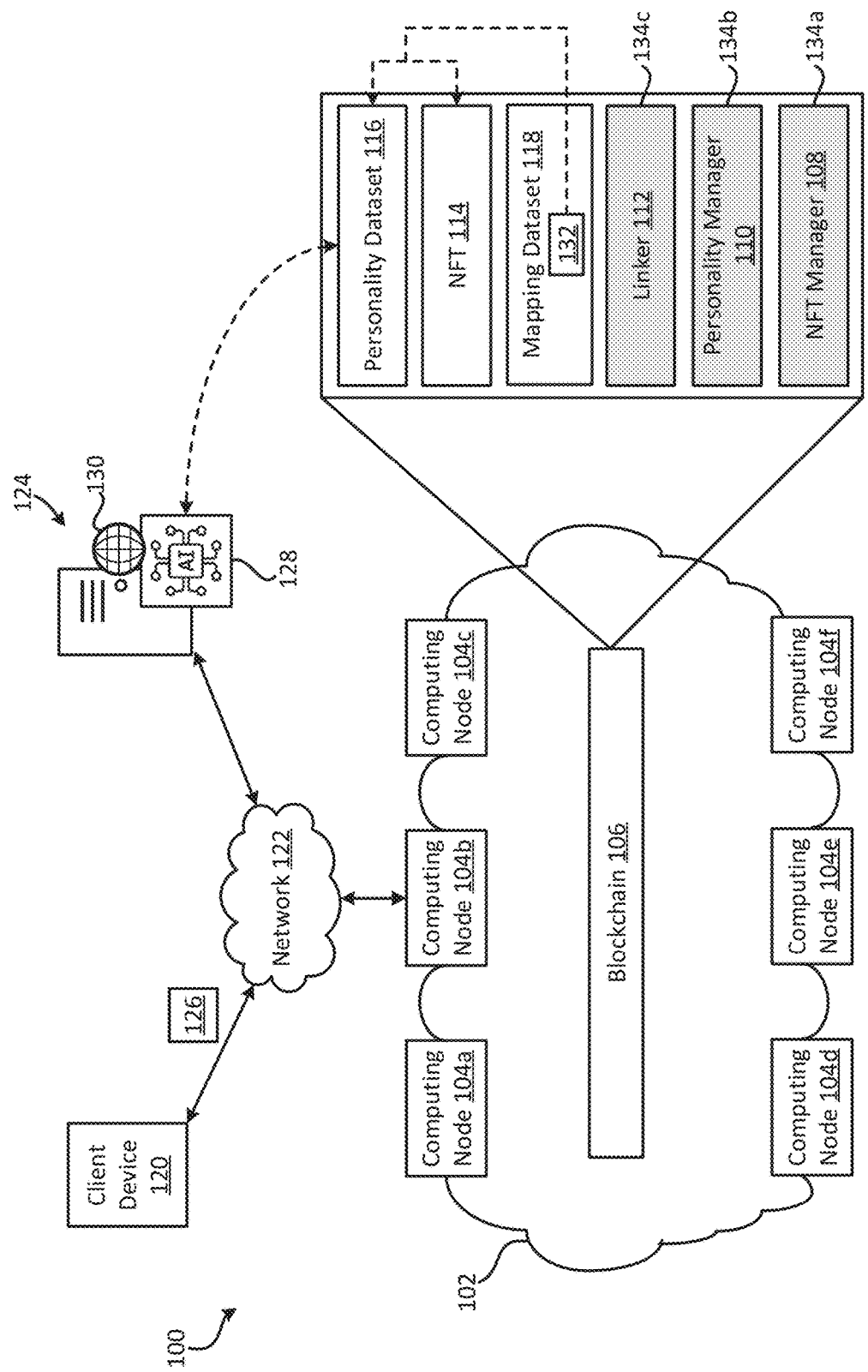
FIG. 1 shows a block diagram of an example of a system for creating and managing artificially intelligent entities represented as non-fungible tokens on a blockchain according to some aspects of the present disclosure.

Non-fungible tokens (NFTs) have generally been static assets, incapable of interaction or change. Some examples of the present disclosure can transform static NFT's into artificially intelligent entities capable of learning, interacting, and changing over time in the digital realm. Given the fact that intelligence is imputed to NFTs to produce the artificially intelligent entities, these entities may also be referred to herein as intelligent NFTs (iNFTs). iNFTs may be represented as animated characters (e.g., with lifelike qualities) that are capable of learning and interacting.

In some examples, an iNFT can be generated as follows. A blockchain network (e.g., a group of nodes) hosting a blockchain can execute a first smart contract to generate an NFT. The NFT can be a static NFT at this stage, but will ultimately represent an artificially intelligent entity on the blockchain. The NFT may correspond to (e.g., link to or contain) a visual representation of the artificially intelligent entity, for example as a static character or an animated character into which artificial intelligence will be imputed. The blockchain network can also execute a second smart contract to generate one or more tokens on the blockchain separately from the NFT. In some cases, the one or more tokens may also be NFTs. The tokens can store a personality dataset that defines at least some personality characteristics of the artificially intelligent entity. Examples of the personality characteristics can include intelligence attributes, voice attributes, psyche attributes, identity attributes, and skill attributes of the artificially intelligent entity. The personality dataset can be formatted for use with an artificial intelligence (AI) engine, which can be located off the blockchain and provide the underlying intelligence to the artificially intelligent entity. The AI engine can include one or more machine-learning models, such as a Transformer Language model like the Generative Pre-Trained Transformer (GTP)-3 model.

Having generated the NFT and the tokens, the blockchain network can then execute a third smart contract to link the NFT to the tokens, thereby assigning the personality characteristics to the artificially intelligent entity. Through this link, the artificially intelligent entity can be imparted its personality. Such an artificially intelligent entity may not only be perceivably intelligent, but can be interactive, animated, and even capable of content creation.

Artificially intelligent entities created through this process can be deployed in a virtual ecosystem in which the artificially intelligent entities can perform tasks, interact with their owners, interact with third parties, and interact with one another. Examples of the tasks may include playing games; completing challenges; creating content such as images, videos, and datasets; analyzing or processing datasets; etc. Through these interactions and tasks, the artificially intelligent entities can learn, i.e., their intelligence levels can be increased, over time. Data generated and collected through performance of the interactions and tasks can be contributed back to the virtual ecosystem in a feedback loop and may be relatively continuously used to train and improve the underlying AI engine supporting the ecosystem. As artificially intelligent entities perform tasks and contribute more to the virtual ecosystem, their intelligence levels can correspondingly increase. In some cases, the intelligence of an artificially intelligent entity can increase over time through a series of predefined intelligence levels, each of which may impart additional functional capabilities to the artificially intelligent entity.

Within the virtual ecosystem, intelligence can be apportioned among the artificially intelligent entities using cryptographic tokens that can serve as intelligence units. When the artificially intelligent entity is created, a certain number of cryptographic tokens can be assigned to the artificially intelligent entity by default. This may involve transferring the cryptographic tokens to a digital wallet associated with the artificially intelligent entity, such as the digital wallet to which the corresponding NFT is assigned. The total number of cryptographic tokens assigned to the wallet can dictate the intelligence level of the artificially intelligent entity, such that the artificially intelligent entity has a higher intelligence level when there is a larger number of cryptocurrency tokens assigned to the digital wallet and a lower intelligence level when there is a smaller number of cryptocurrency tokens assigned to the digital wallet. As the artificially intelligent entity performs virtual tasks or other events occur, the system may transfer more cryptographic tokens to the digital wallet to increase the intelligence level of the artificially intelligent entity, or may rescind cryptographic tokens from the digital wallet to decrease the intelligence level of the artificially intelligent entity. In this way, the intelligence level of the artificially intelligent entity can dynamically change over time in response to such events. If the total number of cryptographic tokens available in the virtual ecosystem is fixed, the intelligence value of the cryptographic tokens may also dynamically change over time based on the overall intelligence of the virtual ecosystem.

The cryptographic token may also serve as a payment method between the artificially intelligent entities in the virtual ecosystem. In some examples, the cryptographic token may be used by a first artificially intelligent entity to gain access to an AI service being provided by a second artificially intelligent entity, or to tip the second artificially intelligent entity, purchase an NFT or other assets in a marketplace hosted on the virtual ecosystem, or make requests of a second artificially intelligent entity. By incentivizing interaction between artificially intelligent entities through the award of cryptographic tokens, an economy for goods and services may be fostered between artificially intelligent entities. Furthermore, the transfer of cryptographic tokens between artificially intelligent entities may democratize governance of the virtual ecosystem, allowing the ecosystem to be policed through award and rescission of intelligence tokens.

These illustrative examples are provided to introduce the reader to the general subject matter discussed here and are not intended to limit the scope of the disclosed concepts. The following sections describe various additional features and examples with reference to the drawings in which similar numerals indicate similar elements but, like the illustrative examples, should not be used to limit the present disclosure.

FIG. 1 shows a block diagram of an example of a system 100 for creating and managing artificially intelligent entities represented as non-fungible tokens (NFTs) on a blockchain 106 according to some aspects of the present disclosure. The blockchain 106 is hosted by a blockchain network 102 that can include any number and combination of computing nodes ("nodes"), such as computing nodes 104a-f. Examples of the nodes can include desktop computers, servers, and specialized mining computers such as application-specific integrated circuit (ASIC) miners.

The blockchain 106 can provide an immutable record relating to the ownership and transfer of cryptographic tokens, such as NFTs. To facilitate use of the blockchain 106, the computing nodes 104a-f can each have access to a respective copy of the blockchain 106 use their respective copies to validate blockchain transactions. In some examples, the computing nodes 104a-f can validate transactions by consensus, in which a new record is only added to the blockchain 106 if many (e.g., a majority) of the computing nodes 104a-f agree that the record should be added. The computing nodes 104a-f may employ one or more consensus algorithms to reach such a consensus. Examples of the consensus algorithms can include proof of work, proof of stake, practical byzantine fault tolerance, proof of burn, proof of history, proof of reputation, or combinations thereof.

A client device 120 can interact with the blockchain network 102 to initiate the generation of an artificially intelligent entity. Examples of the client device 120 can include a mobile device, laptop computer, desktop computer, or server. The client device 120 can interact with the blockchain network 102 via one or more networks 122, such as a local area network or the Internet. For example, the client device 120 can transmit one or more commands 126 to the blockchain network 102 for causing the blockchain network 102 to create an artificially intelligent entity.

The blockchain network 102 can respond to the commands by executing smart contracts 134a-c configured to assist in generating the artificially intelligent entity. The smart contracts 134a-c can include an NFT manager 108, a personality manager 110, and a linker 112. Although these smart contracts 134a-c are shown in FIG. 1 as separate from one another, in other examples some or all of the functionality of these smart contracts 134a-c may be combined into a smaller number of smart contracts, such as a single smart contract. Other types of smart contracts may also be used to implement some aspects described herein, although not shown in FIG. 1 for clarity. Each of the smart contracts 134a-c will now be briefly described in turn.

The NFT manager 108 can define an interface that enables an NFT 114 to be created, managed, owned, and/or transferred on the blockchain 106. A number of standards have emerged for defining such interfaces. The particular standard used can depend on the context, such as the underlying type of blockchain 106. For example, if the blockchain 106 is the Ethereum blockchain, the NFT manager's 108 interface may be defined using the ERC-721 or ERC-1155 standards. The blockchain network 102 can execute the NFT manager 108 to generate the NFT 114 on the blockchain 106, where the NFT 114 can eventually represent the artificially intelligent entity.

The NFT 114 may include a link to a location (e.g., a website or server) off the blockchain 106 that provides a visual representation of the artificially intelligent entity. Alternatively, the NFT 114 itself may include data encoding the visual representation of the artificially intelligent entity. The visual representation may be a static image or an animation. In some examples, the visual representation may have lifelike features, such as a face with hair, eyes, ears, cheeks, and a mouth that may be capable of movement to produce facial expressions. The visual representation may also include other body parts, such as legs, arms, tails, feet, etc. In some examples, the visual representation may include accessories, such as jewelry, hats, canes, glasses, weapons, etc. that are movable and/or usable to perform tasks. Movements and expressions of the visual representation may be supported by an AI engine 128, which is described in greater detail later on.

The personality manager 110 can define an interface that enables a personality dataset 116 to be created, managed, owned, and/or transferred on the blockchain 106. The personality dataset 116 can define the personality characteristics of the artificially intelligent entity. The personality characteristics can be stored as one or more cryptographic tokens on the blockchain 106. Since the cryptographic tokens define the personality of the artificially intelligent entity, they can be referred to herein as personality tokens. The personality tokens may be NFTs or other types of cryptographic tokens. For example, if the blockchain 106 is the Ethereum blockchain, the personality manager 110 may generate a personality dataset as an NFT in accordance with the ERC-721 or ERC-1155 standards. If a personality dataset is distributed among multiple personality tokens on the blockchain 106, the personality tokens may be linked together to collectively form the personality dataset. Such a link may be effectuated by storing correlations in a datastore that relate the personality tokens' identifiers to one another.

Figure 2:
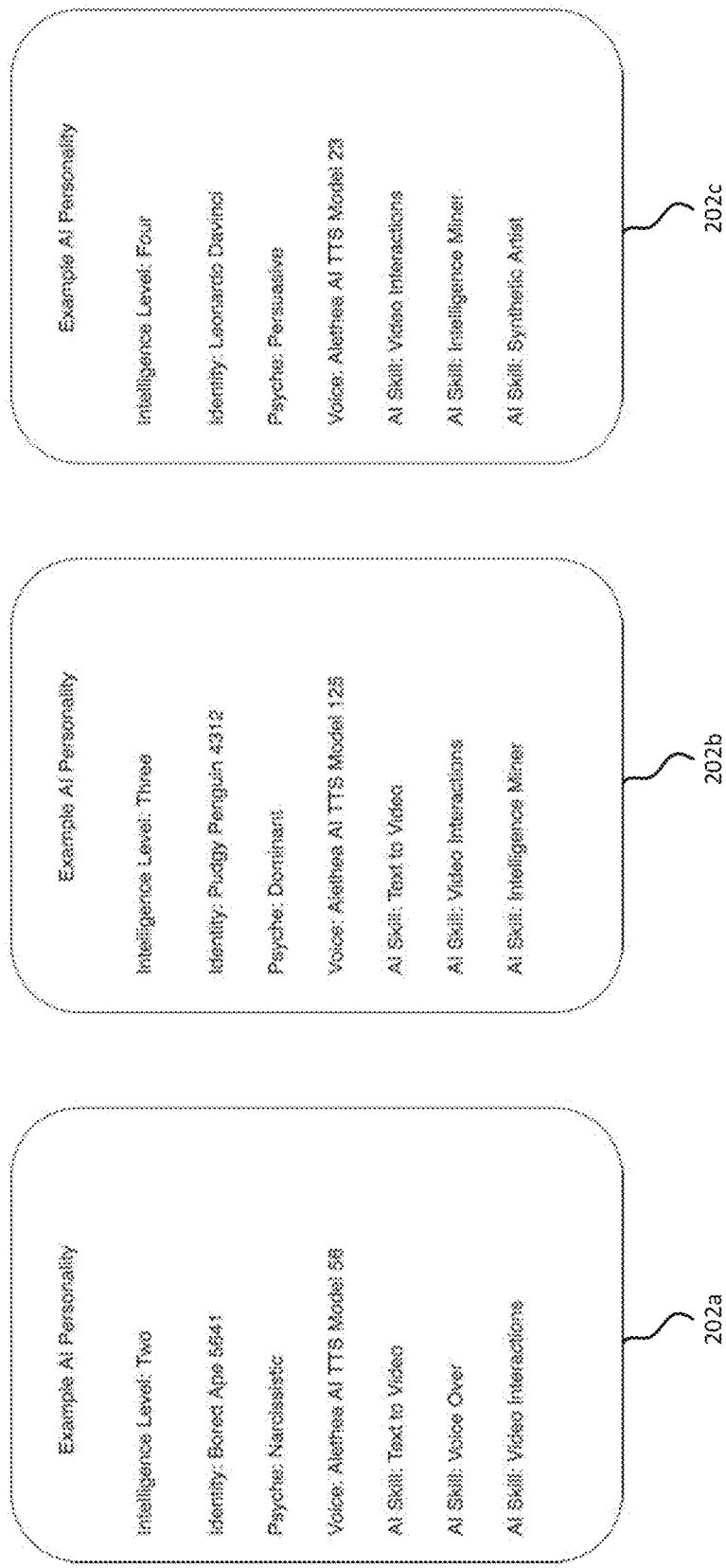
FIG. 2 shows an example of personality datasets according to some aspects of the present disclosure.

The personality characteristics can correspond to personality traits that define how the artificially intelligent entity functions and is perceived. Examples of the personality characteristics can include intelligence attributes such as an intelligence level, capability to learn, and learning style; voice attributes such as a language, accent, style, cadence, harmonic structure, tone, and intensity; psyche attributes such as demeanor, temper, disposition, habits, empathy, beliefs, and values; identity attributes such as name, age, gender, height, weight, history, and familial relationships; skill attributes such as experience, capability, and expertise in performing tasks; and generational attributes such as an evolutionary stage. Three examples of AI personalities 202a-c are shown in FIG. 2. In these examples, the AI personalities 202a-c can define intelligence levels, identities, psyches, voices, and skills for corresponding artificially intelligent entities. Each of the AI personalities 202a-c can be stored as a personality dataset for an individual artificially intelligent entity.

Returning to FIG. 1, the personality dataset 116 can be formatted for use with an AI engine 128. For example, the personality dataset 116 can be formatted as inputs (e.g., prompts) for the AI engine 128. The AI engine 128 can receive the inputs and generate an output based on the inputs. In some such examples, the personality dataset 116 can be stored as a hash of one or more values, such as keywords, that can be plugged in as inputs to the AI engine 128 and that define different types of personality traits. The personality dataset 116 may also include other types of information, such as access rights and uniform resource locators (URLs) to executable code that support personality traits of the artificially intelligent entity. For example, the voice attributes may include access rights to a trained model that generates a unique voice, or may include a uniform resource locator (URL) where executable code for the voice model is stored and accessible.

The AI engine 128 can include any suitable number of machine-learning models to impart intelligence to the artificially intelligent entity. Examples of such machine-learning models can include neural networks such as recurrent neural networks and convolutional neural networks; decision trees such as classification trees and regression trees; classifiers such as naïve bias classifiers, logistic regression classifiers, ridge regression classifiers, random forest classifiers, and support vector machines; clusterers such as k-means clusterers, mean-shift clusterers, and spectral clusterers; factorizers such as factorization machines, principal component analyzers, and kernel principal component analyzers; and ensembles or other combinations of machine-learning models. As one specific example, the AI engine 128 can include a Large Language Model, such as the GTP-3 model, which can accept the personality dataset 116 as input and generate one or more outputs in conformity with the personality characteristics defined in the input. In this way, the AI engine 128 can serve as the "brain" of the artificially intelligent entity. As shown in FIG. 1, the AI engine 128 may be located off the blockchain 106. It is possible, in some embodiments, to locate the AI engine 128 on the blockchain 106 or a different blockchain. However, because the blockchain 106 is immutable, locating the personality dataset 116 on a blockchain can make the personality of the artificially intelligent entity relatively fixed, whereas locating the AI engine 128 off any blockchain provides the flexibility for the AI engine 128 to be iteratively trained and updated over time.

In some examples, each artificially intelligent entity can have its own corresponding AI engine 128 that is specific to and supports that entity's intelligence. In other examples, the system 100 can include a single AI engine 128 that is centralized and supports multiple artificially intelligent entities (e.g., serve as the brain for many artificially intelligent entities). To effectuate this arrangement, the AI engine 128 can be provided with each artificially intelligent entity's personality dataset in addition to a target input, so that the AI engine 128 can generate an output that simulates how that particular artificially intelligent entity would respond to the target input based on that entity's individual personality dataset. In some examples, the centralized AI engine 128 can receive data from the multiple artificially intelligent entities, for example, data generated or collected by the multiple artificially intelligent entities as they perform tasks and interactions. The data can be used as training data to further train and improve the AI engine 128 for the benefit of all of the artificially intelligent entities it supports.

In some examples, the AI engine 128 may represent multiple distributed AI engines that can be used to support multiple artificially intelligent entities. For example, a first AI engine can be used to support a first group of artificially intelligent entities, a second AI engine can be used to support a second group of artificially intelligent entities, and so on. The various AI engines 128 can be interconnected so as to share data and functionality for their collective training and improvement, thus functioning as a single AI engine.

Having generated the NFT 114 and the personality dataset 116, the blockchain network 102 can next execute the linker 112. The linker 112 can link (e.g., correlate) the NFT 114 to the personality dataset 116. This act of "fusion" effectively assigns the personality characteristics defined in the personality dataset 116 to the artificially intelligent entity represented by the NFT 114. In particular, the linker 112 can generate and store a correlation 132 between the NFT 114 and the personality dataset 116. This correlation 132 is represented in FIG. 1 by a dashed double-sided arrow. In some examples, the correlation 132 may be an association between a unique identifier of the NFT 114 and one or more unique identifiers of one or more personality tokens containing the personality dataset 116.

Over time, the personality dataset 116 can evolve through the creation of more personality tokens on the blockchain 106. These additional personality tokens can define additional personality characteristics, or changes to existing personality characteristics, associated with the artificially intelligent entity. Once added to the blockchain 106, these additional personality tokens may be correlated by the linker 112 to the existing personality dataset 116 and/or NFT 114, so as to impart the added or changed personality characteristics to the artificially intelligent entity.

As shown in FIG. 1, the correlation 132 can be stored in a mapping dataset 118. The mapping dataset 118 may contain multiple such correlations and may be immutable. The mapping dataset 118 can be maintained in any suitable location on or off the blockchain 106. For example, the mapping dataset 118 may be stored on the blockchain 106 in a location that is separate from the NFT 114, the personality dataset 116, and/or the smart contracts 134a-c. As another example, the mapping dataset 118 may be stored off the blockchain 106 in a database. Although the mapping dataset 118 is shown in FIG. 1 as being separate from the linker 112, in other examples the mapping dataset 118 may be part of the linker 112.

The combination of the NFT 114, personality dataset 116, and the AI engine 128 can yield an artificially intelligent entity that has some aspects located on-chain (on the blockchain 106) and some aspects located off-chain (off the blockchain 106). The artificially intelligent entity can perform various tasks and learn over time through continued training of the AI engine 128. These types of artificially intelligent entities can be used in a variety of ways, such as by voiceover artists training and creating custom voice models; by non-technical creators using a design studio or another web application to create a new online psyche or persona; by online personalities who wish to tokenize their likeness, such as their voice or face, and license it in a decentralized ecosystem; and by users or companies monetizing AI services offered by the system 100.

The collection of smart contracts 134a-c used to generate the artificially intelligent entity (or "iNFT") can be referred to as the iNFT protocol. The iNFT protocol is decentralized because the smart contracts 134a-c are executed by the distributed set of nodes 104a-f of the blockchain network 102. The iNFT protocol can enable users to turn NFTs into iNFTs without the protocol requiring custody (e.g., locking, staking, wrapping, and swapping) of the NFTs or applying other changes to the underlying NFTs. This allows owners of the NFTs to utilize the NFTs outside the iNFT protocol and can reduce the risks of losing the NFTs by an error or malicious activity. This also allows ownership of the artificially intelligent entities to be easily transferred like regular NFTs. For example, an artificially intelligent entity may be transferrable among parties by transferring the corresponding NFT 114 among the parties.

As one particular example, the NFT 114 may represent an artificially intelligent entity on the blockchain 106, as described above. The NFT 114 may be assigned to a first digital wallet of a current owner. To transfer ownership of the artificially intelligent entity (e.g., at the request of the current owner), the blockchain network 102 can add a transaction to the blockchain 106 that transfers the NFT 114 from the first digital wallet of the current owner to a second digital wallet of a new owner. Because the NFT 114 is unchanged by this transaction and the mapping dataset 118 maintains the link between the NFT 114 and the personality dataset 116, transferring the NFT 114 between the digital wallets may allow ownership of the artificially intelligent entity to be easily transferred without impacting its personality characteristics.

As provably on-chain and temporally consistent personalities, the artificially intelligent entities represent the creation of unique forms of intelligences, with their own evolutionary trajectories. The nature of such an artificially intelligent entity, which can be designed by its creators and stored in the personality dataset 116, can control the evolutionary direction of an artificially intelligent entity's personality. For example, an artificially intelligent entity with a narcissistic disposition may tend to evolve towards being a narcissist. However, artificially intelligent entities can also learn from their experiences within a virtual ecosystem 130, in the sense that the AI engine 128 supporting the artificially intelligent entities can be trained based on those experiences and thus evolve over time.

Once generated, the artificially intelligent entities can "live" in a virtual ecosystem 130. The virtual ecosystem 130 can be a virtual environment such as a metaverse in which artificially intelligent entities can perform virtual tasks, interact, and evolve. Any number of artificially intelligent entities can reside in the virtual ecosystem 130, some or all of which may be represented on the blockchain 106 using NFTs. In some examples, the virtual ecosystem 130 may be a three-dimensional (3D) virtual environment rendered using any suitable engine (e.g., a gaming engine like the Unreal® engine or the Unity® engine).

Within the virtual ecosystem 130, users (e.g., human visitors) and artificially intelligent entities can interact, collaborate, and compete with each other, which can shape or fine-tune the personalities of the artificially intelligent entities. Artificially intelligent entities may also interact with other artificially intelligent entities, independent of a user. An artificially intelligent entity may tend to gravitate towards actions and decisions that come naturally to it based on its personality dataset 116. However, the impact of its experiences can also drive the artificially intelligent entity's decision-making. For example, through various experiences, additional datasets can be generated and used to train the AI engine 128. This can further refine the personality and intelligence of the artificially intelligent entity beyond the initial personality dataset. Thus, two artificially intelligent entities with identical initial personality datasets may develop distinctness based on their experiences, leading the two artificially intelligent entities to make different decisions.

While the AI engine 128 was described above as imparting intelligence to the artificially intelligent entities, the AI engine 128 can also more generally serve as the backbone to the virtual ecosystem 130. It can power not only the artificially intelligent entities but also other AI services that may be provided to visitors. As the artificially intelligent entities engage in tasks, their experiences can be used to further train the AI engine 128, thereby improving the intelligence of the overall system. This can create a symbiotic relationship between the AI engine 128 and the artificially intelligent entities.

The AI engine 128 and the virtual ecosystem 130 can be hosted by a computer system 124. The computer system 124 may be separate from the blockchain network 102 and can include any number and combination of computing devices (e.g., servers) to support the virtual ecosystem 130. In some examples, the computing devices can be configured as a cloud computing environment, which may execute a variety of software services (e.g., microservices and serverless functions) designed to perform functions that support of the virtual ecosystem 130.

In some examples, the artificially intelligent entities can be represented by NFTs distributed across multiple blockchains. For example, there can be multiple blockchains hosted by one or more blockchain networks. Each individual blockchain can have its own set of smart contracts (e.g., linker, personality manager, and NFT manager). Those smart contracts can function as described above to generate NFTs, personality datasets, and mapping datasets on their respective blockchains. Through this process, different artificially intelligent entities can be generated using different blockchains. The computer system 124 can interact with all such blockchains to deploy their artificially intelligent entities into the same virtual ecosystem 130 or different virtual ecosystems.

Although FIG. 1 shows a particular number and arrangement of components, this is intended to be illustrative and non-limiting. Other examples may include more components, fewer components, different components, or a different arrangement of the components than is shown in FIG. 1. For instance, in other examples the computer system 124 may serve as the client device that transmits the commands 126 to the blockchain network 102 to initiate the generation of the artificially intelligent entity. And although some examples are described herein with reference to a blockchain 106, it will be appreciated that similar principles may be applied to other types of digital ledgers, which is also contemplated within the scope of this disclosure.

Figure 3:
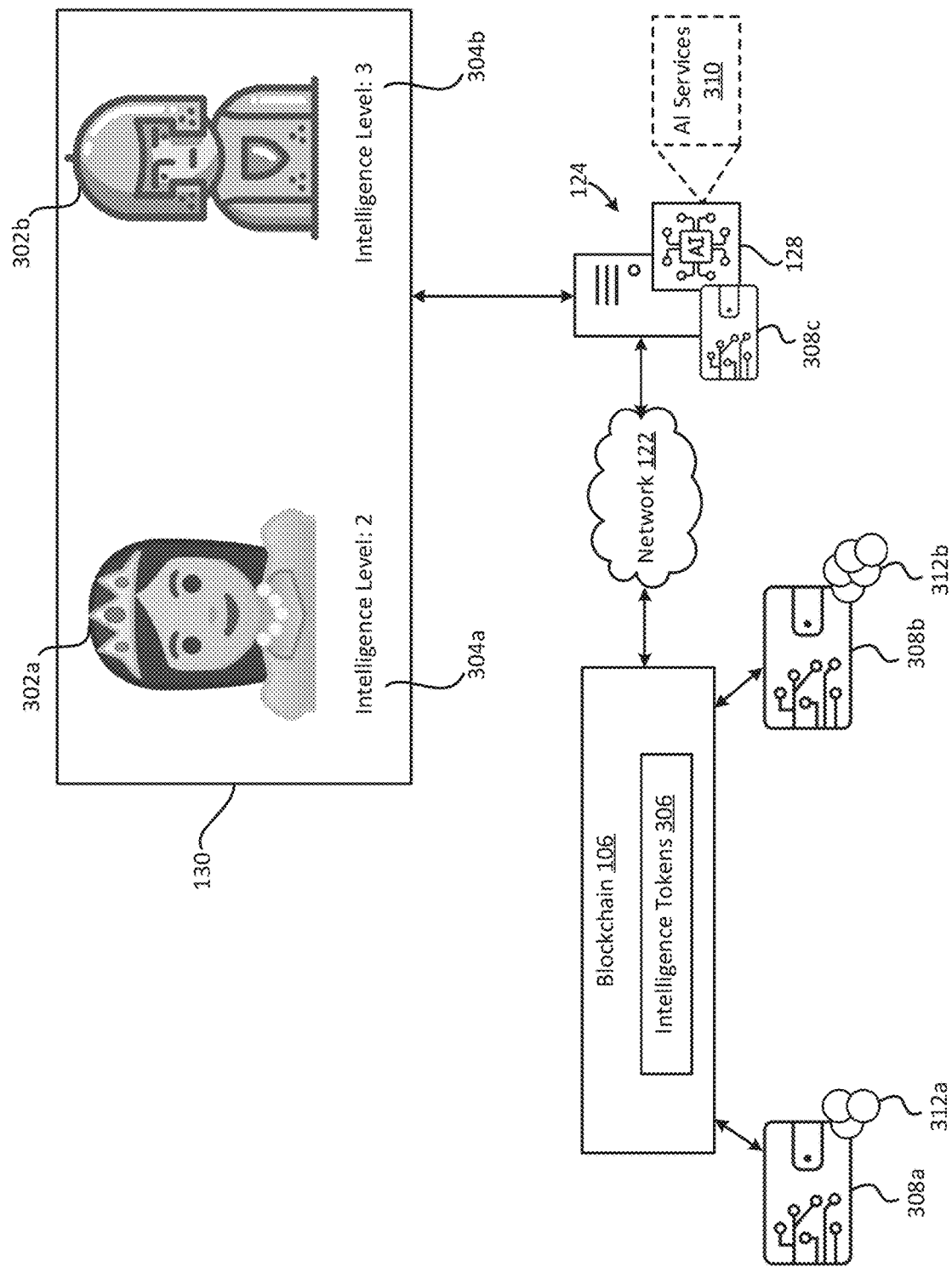
FIG. 3 shows a block diagram of an example of a system including artificially intelligent entities in a virtual ecosystem according to some aspects of the present disclosure.

Referring now to FIG. 3, the flow of intelligence through the virtual ecosystem 130 can occur via cryptographic tokens that are separate from the NFTs and personality datasets described above. Because the cryptographic tokens can each represent an intelligence unit, they are also referred to herein as intelligence tokens 306. The intelligence tokens 306 are fungible cryptographic tokens that are readily interchangeable, unlike the NFTs. Through this tokenization, the intelligence flowing through the virtual ecosystem 130 is defined and measurable.

The intelligence tokens 306 may be generated on the blockchain 106 according to any suitable standard. In an example in which the blockchain 106 is the Ethereum blockchain, the intelligence tokens 306 may be generated according to the ERC-20 standard. Other blockchains may require conformance to other standards. Although the intelligence tokens 306 are shown in FIG. 3 as being located on the same blockchain 106 that contains the NFTs and personality datasets described above, in other examples the intelligence tokens may be stored on another blockchain that is distinct from the blockchain 106.

The number of intelligence tokens 306 assigned to an artificially intelligent entity can define its intelligence level. For example, there are two artificially intelligent entities 302a-b shown in FIG. 3 as human-like characters. A first artificially intelligent entity 302a corresponds to a first digital wallet 308a to which a first set of intelligence tokens 312a can be assigned. The total number of intelligence tokens assigned to the first digital wallet 308a can define the intelligence level 304a of the first artificially intelligent entity 302a. Similarly, a second artificially intelligent entity 302b corresponds to a second digital wallet 308b to which a second set of intelligence tokens 312b can be assigned. The total number of intelligence tokens assigned to the second digital wallet 308b can define the intelligence level 304b of the second artificially intelligent entity 302b. Because there are more intelligence tokens assigned to the second digital wallet 308b in this example, the intelligence level 304b of the second artificially intelligent entity 302b is higher than the intelligence level 304a of the first artificially intelligent entity 302a.

The computer system 124 supporting the virtual ecosystem 130 can increase the number of intelligence tokens 312a assigned to a digital wallet 308a in response to various events, such as the artificially intelligent entity 302a performing certain tasks. To do so, the computer system 124 can interact with the blockchain 106 for causing additional intelligence tokens 306 to be transferred to the digital wallet 308a associated with the artificially intelligent entity 302a. The additional intelligence tokens may be transferred from any suitable source, such as a primary digital wallet 308c associated with the computer system 124 or from another digital wallet 308b associated with another artificially intelligent entity 302b. The primary digital wallet 308c may serve as a centralized location associated with the virtual ecosystem 130 as a whole.

In some examples, the computer system 124 may also rescind intelligence tokens 312a from a digital wallet 308a in response to various events, such as the artificially intelligent entity 302a performing other tasks. To rescind the intelligence tokens 312a, the computer system 124 can interact with the blockchain 106 for causing the intelligence tokens 312a to be transferred from the digital wallet 308a to the primary digital wallet 308c or to another digital wallet 308b associated with another artificially intelligent entity 302b. By transferring the intelligence tokens 306 between digital wallets, the total intelligence of the virtual ecosystem 130 can be dynamically apportioned and reapportioned as the artificially intelligent entities 302a-b perform tasks and engage with the virtual ecosystem 130.

In some examples, the virtual ecosystem 130 has a predefined number of intelligence levels. Each intelligence level may require a progressively greater number of intelligence tokens 306 to unlock. For example, intelligence level 2 may require three intelligence tokens 306 while intelligence level 3 may require five intelligence tokens 306. Unlocking an intelligence level may enable an artificially intelligent entity to have more functional capabilities than were available at a prior intelligence level.

Figure 4:
FIG. 4 shows examples of intelligence levels and associated skills according to some aspects of the present disclosure.

Each new intelligence level may also unlock access to new, off-chain AI services 310 that may be created, curated, incentivized, and offered by the AI engine 128. Different intelligence levels can give artificially intelligent entities the right to access or offer different AI services 310. Some examples of intelligence levels are shown in FIG. 4. Generally, the higher the intelligence level, the more powerful the AI services 310 available to the artificially intelligent entity. As an artificially intelligent entity increases its experiences over time, or passes a certain life span, the owner of the artificially intelligent entity (or the artificially intelligent entity itself) can choose to continue existing within the bounds of a lower intelligence level, or they can choose to evolve their artificially intelligent entity by acquiring an amount of intelligence tokens and moving to the next intelligence level.

There can be a wide variety of AI service 310. In some examples, the AI services 310 may involve the creation or modification of images, videos, audio, textual content (e.g., a story, a poem, a social media post, a blog post, a book, a review, or an article), or any combination of these. Additionally or alternatively, the AI services 310 can include receiving, obtaining, storing, or processing data. In some examples, the AI services 310 may involve interactions with human users, other artificially intelligent entities 302b in the virtual ecosystem 130, or other virtual entities, etc. The AI engine 128 can include one or more models for implementing the AI services 310. Examples of the models can include machine-learning models such as those described above, a Large Language Model, or a combination thereof. Different models may be used to support different AI services 310.

In some examples, the artificially intelligent entity 302a may offer various AI services 310 in exchange for compensation, such as monetary compensation or compensation in the form of work or work product. Different AI services 310 may be offered in exchange for different amounts of compensation (e.g., at different prices). The compensation may be received upon completion or partial completion of an AI service 310. For example, a requestor may submit a request that the artificially intelligent entity 302a produce textual content or a video in relation to a given topic. The requestor can be any suitable entity, such as a human user or another artificially intelligent entity 302b. In exchange for providing this service, the artificially intelligent entity 302a may be paid a certain amount of cryptographic tokens, such as Ethereum tokens or intelligence tokens 306. This payment may be achieved by transferring the cryptographic tokens from a digital wallet associated with the requestor to a another digital wallet 308a associated with the artificially intelligent entity 302a.

One specific example of an AI service 310 can be the "Broadcast" AI service, which may be unlocked at intelligence level 2 or at another intelligence level. This AI service 310 can enable the artificially intelligent entity 302a to create video messages. What the artificially intelligent entity 302a does with the Broadcast AI service may be its prerogative. For example, the artificially intelligent entity 302a may earn additional cryptographic tokens as rewards by offering visitors of the virtual ecosystem 130 the ability to create videos, such as greetings or birthday messages, using this AI service 310. Additionally or alternatively, the artificially intelligent entity 302a may try to create entertaining videos, post them on social media, and create a following.

Another example of an AI service 310 can be the "Interactivity" service. This AI Service can enable an artificially intelligent entity to scale its outreach and interact (e.g., in real time) in with other parties. An artificially intelligent entity may unlock this AI service at intelligence level 3, in some examples. Through these interactions with other parties (e.g., users or artificially intelligent entities), the artificially intelligent entity may earn additional intelligence tokens 306. If an artificially intelligent entity can earn more intelligence tokens by offering this AI service to others than the intelligence being spent by it to use this service, then the artificially intelligent entity may be given the right to further increase its intelligence level and further enhance their intelligence advantage over other artificially intelligent entities.

In some examples, the outputs of the AI services 310 can be controlled by the personality datasets of the artificially intelligent entity. For example, an artificially intelligent entity 302a may use or provide an AI service 310. To do so, the personality dataset associated with the artificially intelligent entity 302a may be supplied as one of the inputs to the AI engine 128, so that the AI engine 128 generates the outputs of the AI service 310 based on the personality characteristics of the artificially intelligent entity 302a. Because the outputs for the AI services 310 may be dictated at least in part by the personality datasets, as well as other datasets acquired through training, two artificially intelligent entities 302a-b applying the same AI service 310 to the same target dataset may yield different outputs from the AI engine 128.

Figure 5:
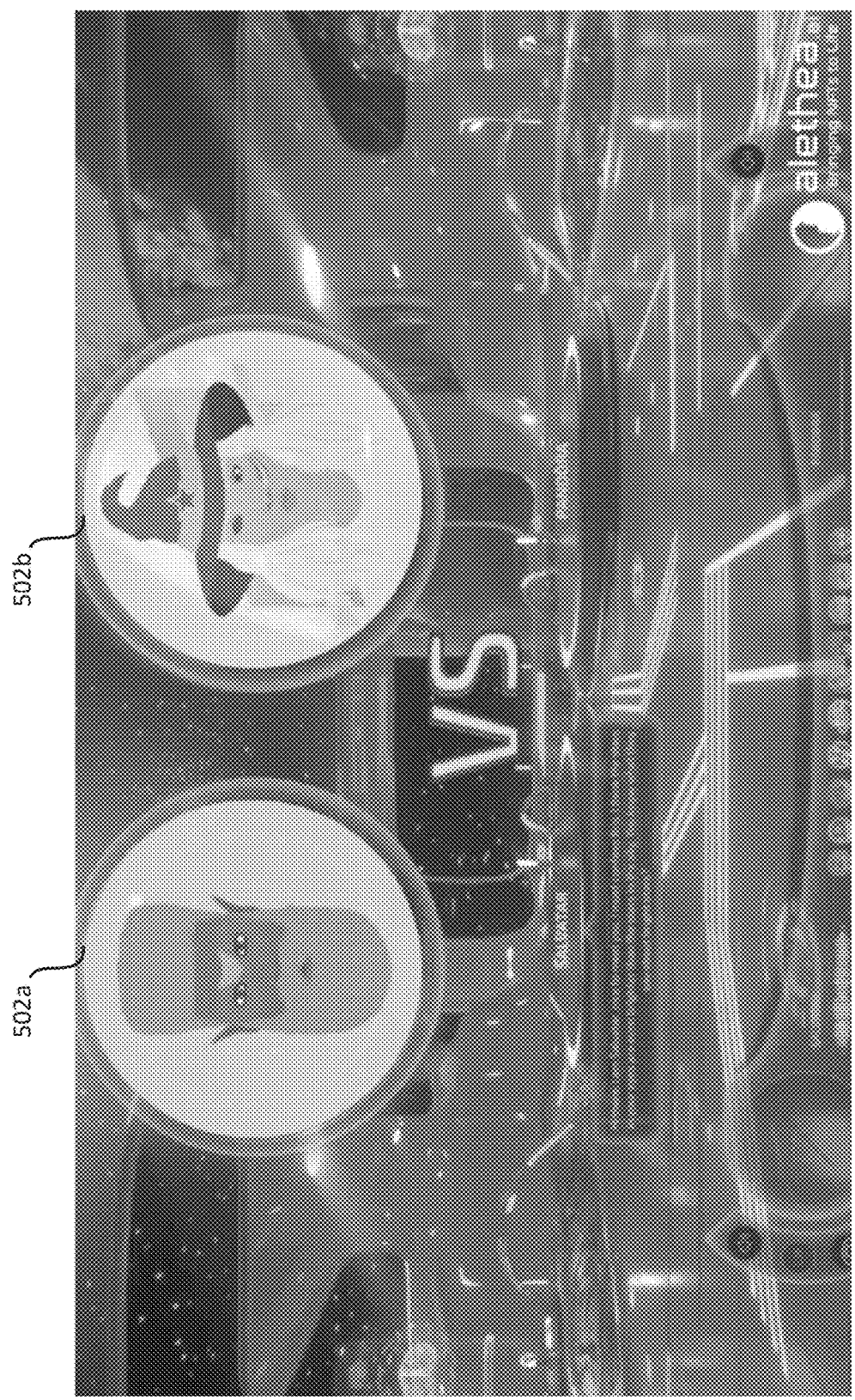
FIG. 5 shows an example of an intelligence mining activity according to some aspects of the present disclosure.

In some examples, the artificially intelligent entities 304a-b can participate in a dataset-creation activities that may be collectively referred to as "intelligence mining." Examples of these activities can include answering questions, collecting data from various sources, solving mathematical problems, reorganizing or reformatting data, identifying objects in images, or any combination of these. These intelligence-mining activities may be gamified to help incentive participation. By performing these activities, artificially intelligent entities 304a-b can generate new datasets that can be used to further train the AI engine 128. The computer system 124 can award the artificially intelligent entities 304a-b with intelligence tokens 306 in return for participating in the intelligence-mining activities. The amount of intelligence tokens 306 awarded for a given intelligence-mining activity may depend on the complexity and difficulty of the activity. For example, more intelligence tokens 306 may be awarded for intelligence-mining activities that are more complex, time consuming, or difficult than for intelligence mining activities that are less complex, time consuming, or difficult. One example of two artificially intelligent entities 502a-b engaging in intelligence mining is shown in FIG. 5. As shown, the two artificially intelligent entities 502a-b can conduct a conversation, which can serve as a new dataset usable to further train the AI engine 128.

As noted above, the intelligence of an artificially intelligent entity 104a is derived from the AI engine 128. Thus when an artificially intelligent entity 302a is described herein as performing a task (e.g., performing an intelligence-mining activity or generating content), it may mean that a subpart of the AI engine 128 that is assigned to the artificially intelligent entity 302a perform the task. For example, a subpart of the AI engine 128 assigned to artificially intelligent entity 302a may complete an intelligence-mining activity or other task on behalf of the artificially intelligent entity 302a. In this way, the AI engine's 130 functionality can be apportioned among the artificially intelligent entities 302a-b in the virtual ecosystem 130 based on their intelligence levels, as dictated by their intelligence-token holdings.

It should be appreciated that even if an artificially intelligent entity 302a does not continue to evolve beyond a particular intelligence level, its intelligence may not remain static. This is because the AI engine 128 supporting the intelligence of the artificially intelligent entity 302*a* may continue to be trained and updated over time. As the AI engine 128 is improved, those improvements may flow to the artificially intelligent entity 302*a*. For example, if the artificially intelligent entity 302*a* was previously allowed to create video messages, over time it may be able to create video messages with more relevant expressions, more animation varieties, higher levels of resolution, etc. Whether it is by unlocking and offering more AI services, engaging in more experiences, learning from others, or participating in the intelligence-mining activities, as an artificially intelligent entity 302*a* becomes more capable and refined in its intelligence, and its outputs become more relevant to its personality, its chances of earning more intelligence tokens 306 rewards may increase.

In some examples, the intelligence tokens 312*a*-*b* may also serve as a payment method between in the virtual ecosystem 130. For example, the intelligence tokens 312*a* may be used by the artificially intelligent entity 302*a* to gain access to an AI service being provided by the second artificially intelligent entity 302*b*, or to tip the artificially intelligent entity 302*b* for performing some service, to purchase an NFT or other assets in a marketplace hosted on the virtual ecosystem 130, or make requests of the artificially intelligent entity 302*b*. By incentivizing interaction between artificially intelligent entities 302*a*-*b* through the award of intelligence tokens 306, an economy for goods and services may be fostered between artificially intelligent entities 302*a*-*b*.

Figure 6:
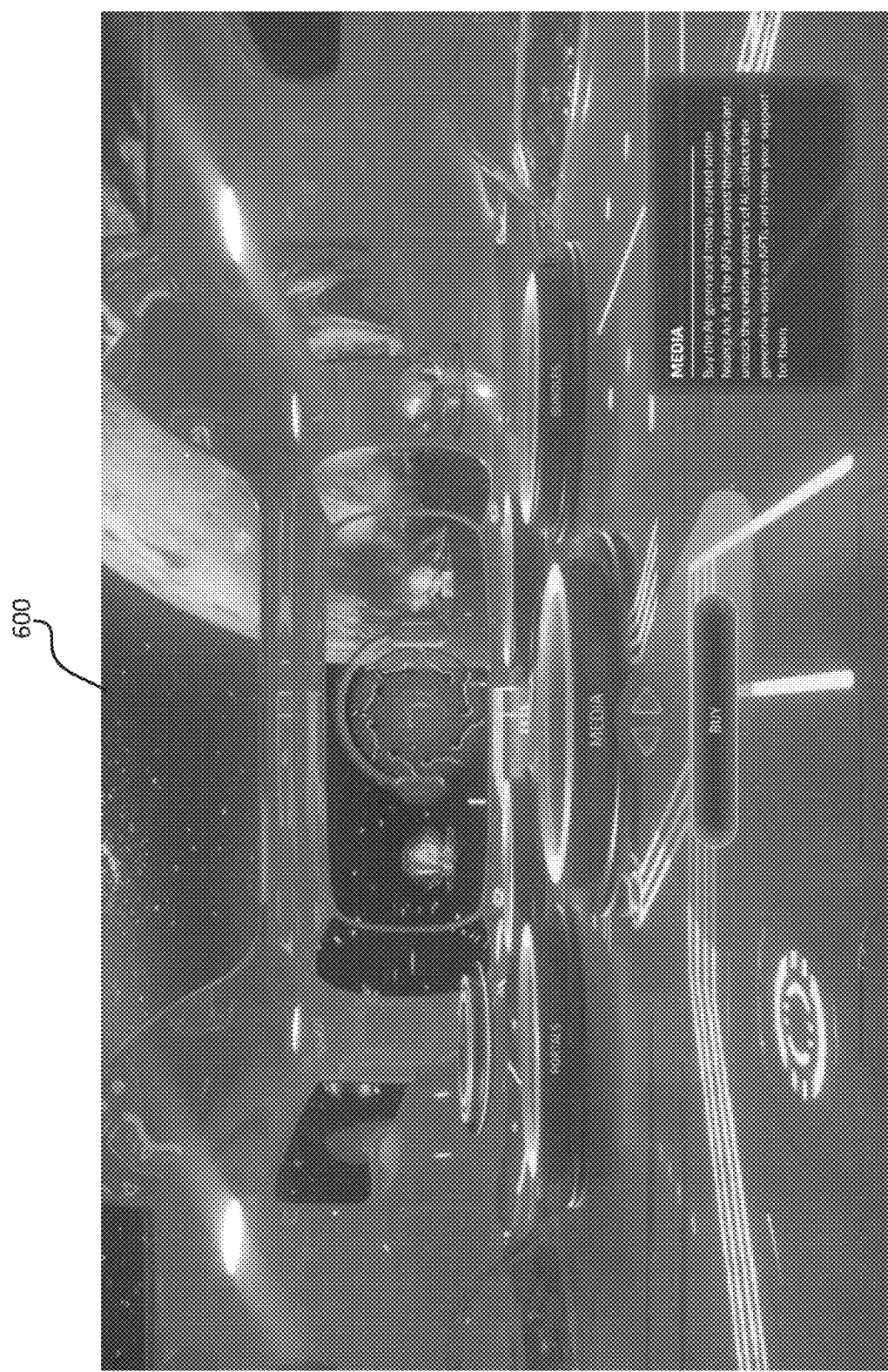
FIG. 6 shows an example of a marketplace according to some aspects of the present disclosure.

One example of the marketplace 600 is shown in FIG. 6. The marketplace 600 can facilitate the purchase and sale of digital assets, some of which may be creative and artistic content generated by the artificially intelligent entities. Examples of such digital assets can include the artificially intelligent entities (e.g., their NFTs); the personality datasets; media such as video content, audio content, and images; portals; and bundles. Digital assets may be sold on the marketplace in exchange for currency or intelligence tokens, which can then be used to increase the intelligence of an artificially intelligent entity. For example, an artificially intelligent entity can generate a creative work and sell it on the marketplace in exchange for a particular amount of intelligence tokens, which can boost the intelligence level of the artificially intelligent entity. This may allow the artificially intelligent entity to create more, better, or different creative works, or unlock other functionality.

Figure 7:
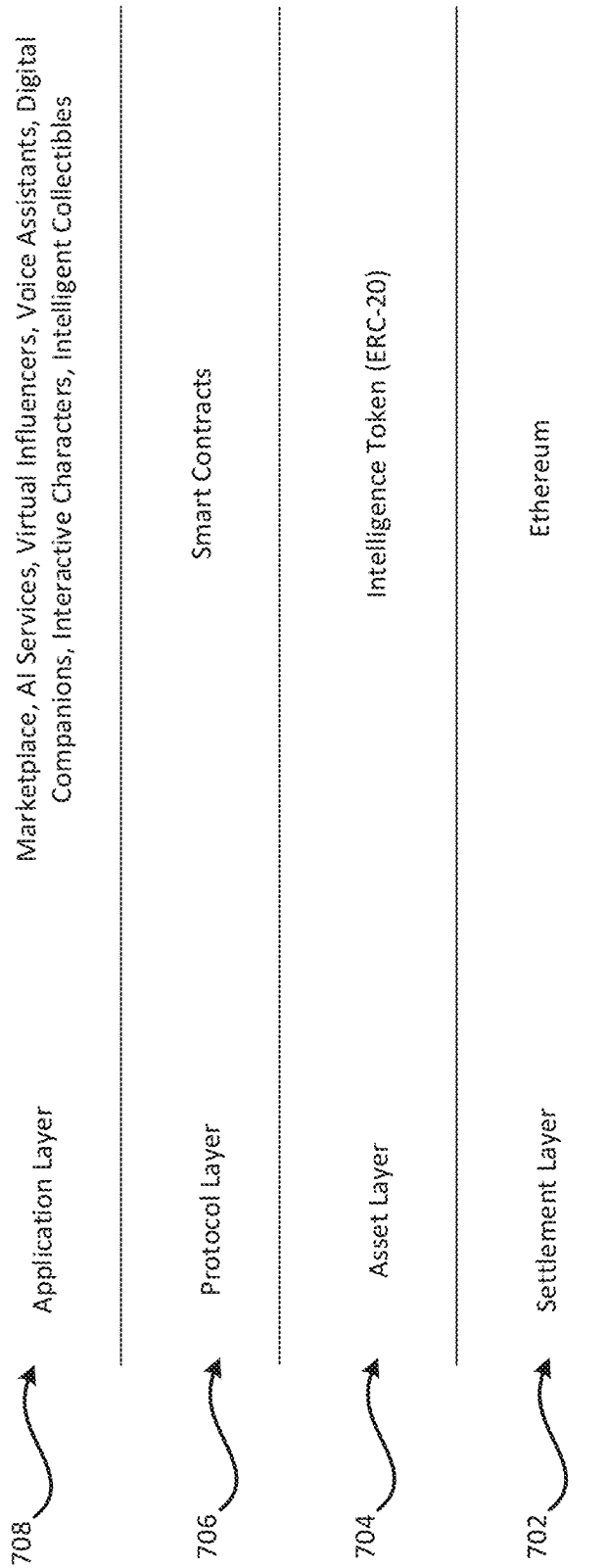
FIG. 7 shows an example of a protocol stack according to some aspects of the present disclosure.

Referring now to FIG. 7, the iNFT protocol can be conceptualized a stack of layers usable to generate the artificially intelligent entities. The layers can include a settlement layer 702, an asset layer 704, a protocol layer 706, and an application layer 708. In some examples, the settlement layer 702 can be the Ethereum blockchain, and all transactions can be settled on that blockchain. Other examples may use other blockchains for the settlement layer 702. The asset layer 704 can include the intelligence tokens, which can be ERC-20 tokens on the Ethereum blockchain. The protocol layer 706 can include some or all of the smart contracts 134*a*-*c* described above with reference to FIG. 1. The application layer 708 can include the marketplace, various AI services, and other applications that can impart functionality to the virtual ecosystem 130. Of course, the number and organization of these layers 702-708 is intended to be illustrative and non-limiting. Other examples may include more layers, fewer layers, different layers, or a different arrangement of layers than is shown in this figure.

Figure 8:
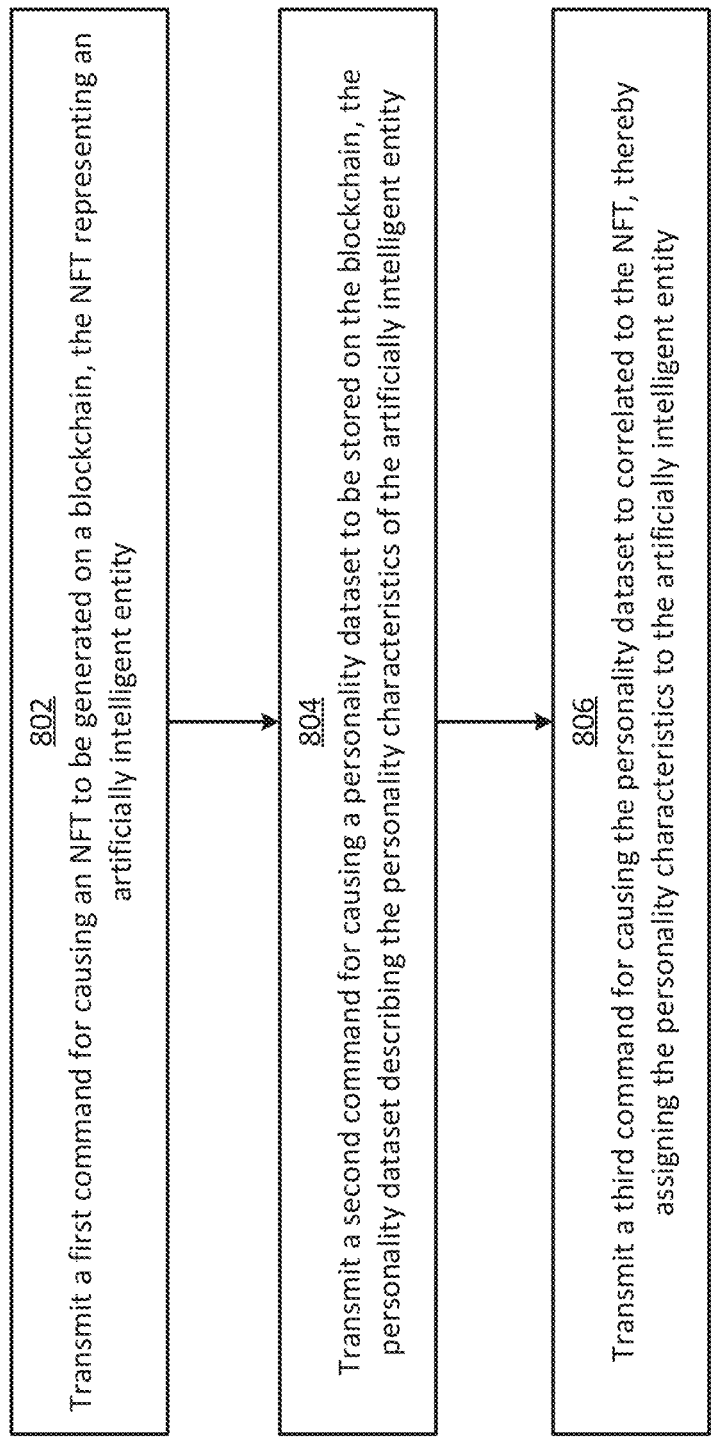
FIG. 8 shows a flow chart of an example of a process for generating an artificially intelligent entity according to some aspects of the present disclosure.

Turning now to FIG. 8, shown is a flow chart of an example of a process for generating an artificially intelligent entity according to some aspects of the present disclosure. Other examples may include more operations, fewer operations, different operations, or a different order of the operations than are shown in FIG. 8. The operations are described below with reference to the components of FIGS. 1-3.

In block 802, a computing device transmits a first command for causing an NFT 114 to be generated on a blockchain 106. Examples of the computing device can include the client device 120 or the computer system 124. The first command can be one of the commands 126 transmitted to the blockchain network 102, and may be configured to cause the blockchain network 102 to execute the NFT manager 108 to generate the NFT 114. The NFT 114 can represent an artificially intelligent entity 302*a*.

In block 804, the computing device transmits a second command for causing a personality dataset 116 to be stored on the blockchain 106. The personality dataset 116 may be stored on the blockchain 106 separately from the NFT 114. The second command can be one of the commands 126 transmitted to the blockchain network 102, and may be configured to cause the blockchain network 102 to execute the personality manager 110 to generate and store the personality dataset 116. The personality dataset 116 can describe the personality characteristics of the artificially intelligent entity 302*a*.

In block 806, the computing device transmits a third command for causing the personality dataset 116 to be correlated to the NFT 114. The third command can be one of the commands 126 transmitted to the blockchain network 102, and may be configured to cause the blockchain network 102 to execute the linker 112 to correlate the NFT 114 to the personality dataset 116. This correlation can assign the personality characteristics to the artificially intelligent entity 302*a*.

Figure 9:
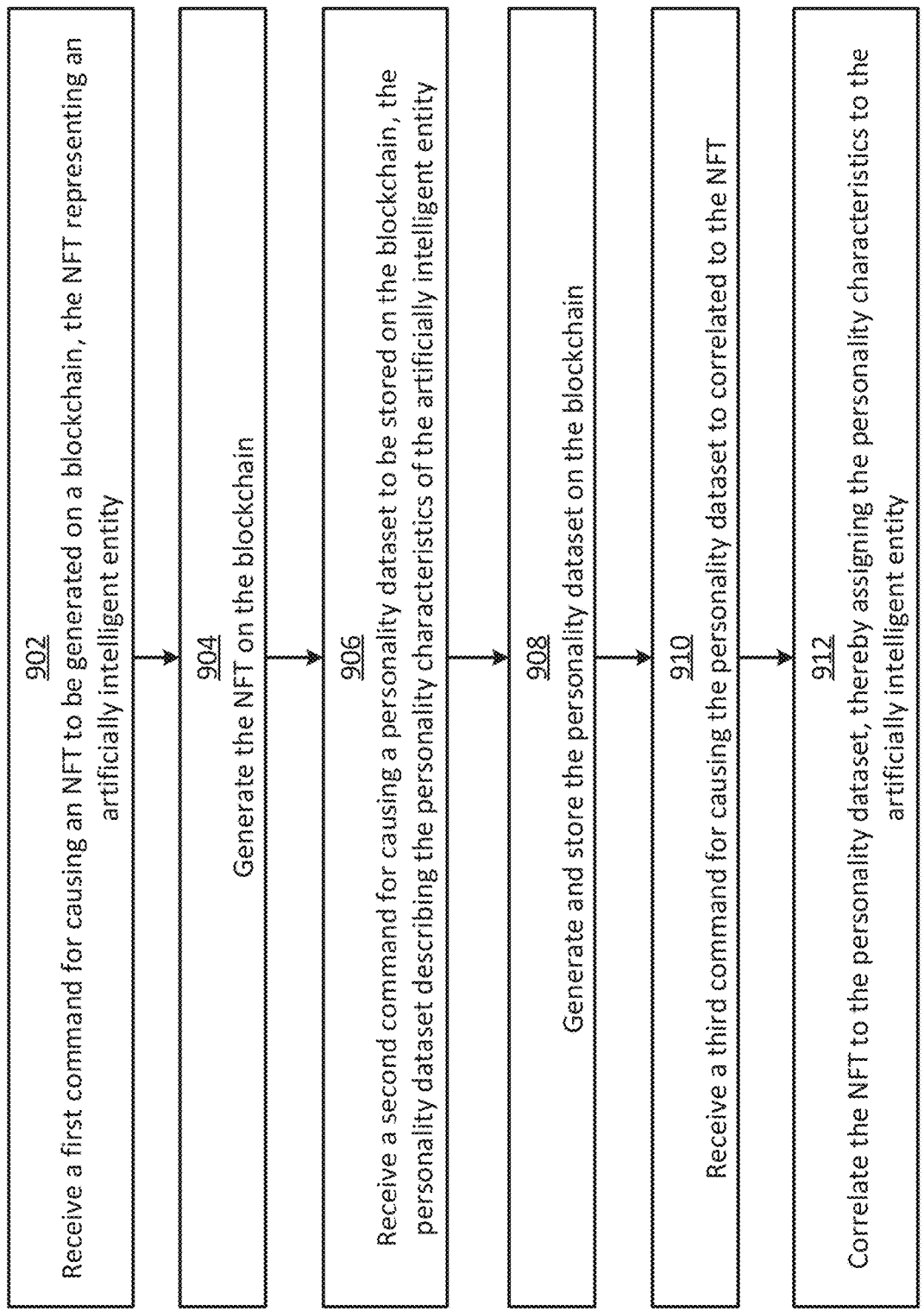
FIG. 9 shows a flow chart of another example of a process for generating an artificially intelligent entity according to some aspects of the present disclosure.

Turning now to FIG. 9, shown is a flow chart of another example of a process for generating an artificially intelligent entity according to some aspects of the present disclosure. Other examples may include more operations, fewer operations, different operations, or a different order of the operations than are shown in FIG. 9. The operations are described below with reference to the components of FIGS. 1-3.

In block 902, a blockchain network 102 receives a first command for causing an NFT 114 to be generated on a blockchain 106. This first command may correspond to the first command transmitted by the computing device in block 802.

In block 904, the blockchain network 102 generates the NFT 114 on the blockchain 106 in response to receiving the first command. In some examples, the blockchain network 102 can generate the NFT 114 on the blockchain 106 by executing an NFT manager 108. The NFT 114 can represent an artificially intelligent entity 302*a*.

In block 906, a blockchain network 102 receives a second command for causing a personality dataset 116 to be stored on the blockchain 106. This second command may correspond to the second command transmitted by the computing device in block 804. The personality dataset 116 can describe the personality characteristics of the artificially intelligent entity 302*a*.

In block 908, the blockchain network 102 generates the personality dataset 116 on the blockchain 106 in response to receiving the second command. In some examples, the blockchain network 102 can generate and store the personality dataset 116 on the blockchain 106 by executing a personality manager 110. The personality dataset 116 may be stored on the blockchain 106 separately from the NFT 114.

In block 910, the blockchain network 102 receives a third command for causing the personality dataset 116 to be correlated to the NFT 114. This third command may correspond to the third command transmitted by the computing device in block 806.

In block 912, the blockchain network 102 correlates the NFT 114 to the personality dataset 116 in response to receiving the third command. In some examples, the blockchain network 102 can correlate the NFT 114 to the personality dataset 116 by executing a linker 112. In effect, this correlation 132 can assign the personality characteristics to the artificially intelligent entity 302a. The correlation 132 can be stored in a mapping dataset 118 on or off the blockchain 106.

Figure 10:
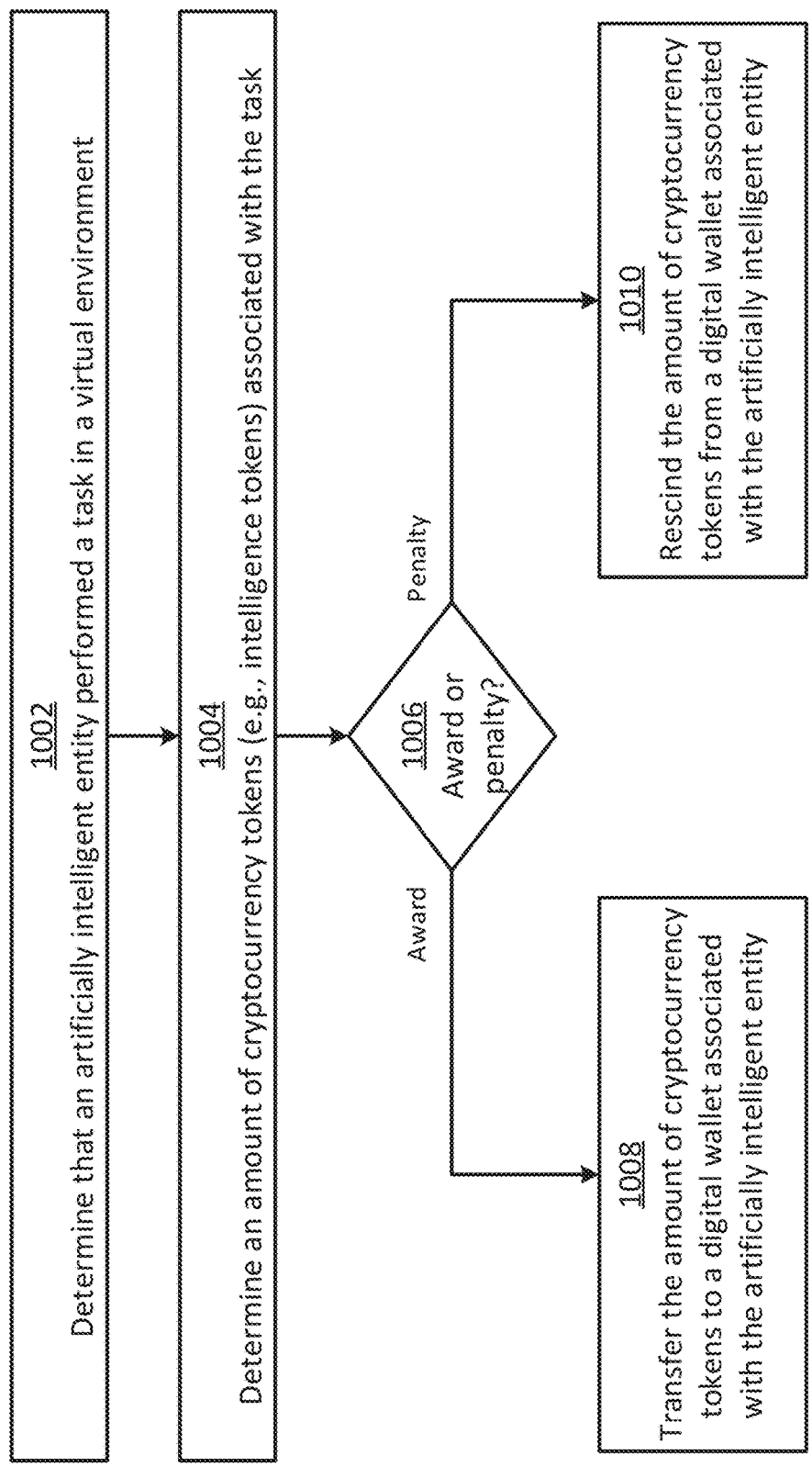
FIG. 10 shows a flow chart of an example of a process for modifying an intelligence level of an artificially intelligent entity according to some aspects of the present disclosure.

Turning now to FIG. 10, shown is a flow chart of an example of a process for modifying an intelligence level of an artificially intelligent entity according to some aspects of the present disclosure. Other examples may include more operations, fewer operations, different operations, or a different order of the operations than are shown in FIG. 10. The operations are described below with reference to the components of FIGS. 1-3.

In block 1002, a computer system 124 determines that an artificially intelligent entity 302a has performed (e.g., completed) a task in a virtual environment, such as the virtual ecosystem 130. The artificially intelligent entity 302a can be associated with a digital wallet 308a to which cryptocurrency tokens are assigned on a blockchain 106. The cryptocurrency tokens can be intelligence tokens 306 that serve as intelligence units defining an intelligence level 304a of the artificially intelligent entity 302a.

In block 1004, the computer system 124 determines an amount of cryptocurrency tokens (e.g., intelligence tokens 306) associated with the task. For example, the computer system 124 may have a predefined mapping that correlates certain tasks to certain amounts of tokens. The predefined mapping may be created and updated by a developer of the virtual ecosystem 130.

In block 1006, the computer system 124 determines whether the task corresponds to an award or a penalty. For example, the artificially intelligent entity 302a may be rewarded for performing some tasks and penalized for performing others. In some such examples, the computer system 124 may determine whether the task corresponds to an award or penalty based on whether the amount of cryptocurrency tokens assigned to the task is positive or negative in the mapping. The task may correspond to an award if the number of cryptocurrency tokens assigned to the task is positive (e.g., +3), and the task may correspond to a penalty if the number of cryptocurrency tokens assigned to the task is negative (e.g., −5). Other approaches may alternatively be used to determine whether a task corresponds to an award or a penalty, such as by using a second mapping that correlates tasks to award flags and penalty flags.

If the task is associated with an award, the process can continue to block 1008. In block 1008, the computer system 124 initiates a transfer of the amount of cryptocurrency tokens to a digital wallet 308a associated with the artificially intelligent entity 302a. This can increase the intelligence level 304a of the artificially intelligent entity 302a from a first intelligence level to a second intelligence level. In this context, the terms "first" and "second" are simply used to distinguish the intelligence levels from one another, rather than denote a specific intelligence-level number (e.g., intelligence level 1 versus intelligence level 2). Thus, the "first intelligence level" may be conceptualized as intelligence level X and the "second intelligence level" may be conceptualized as any intelligence level higher than intelligence level X. The intelligence tokens may be transferred to the digital wallet 308a from another digital wallet, such as the primary digital wallet 308c of the computer system 124. To initiate the transfer, the computer system 124 may transmit one or more commands to the blockchain network 102.

If the task is associated with a penalty, the process can continue to block 1010. In block 1010, the computer system 124 rescinds the amount of cryptocurrency tokens from the digital wallet 308a associated with the artificially intelligent entity 302a. To do so, the computer system 124 can transmit one or more commands to the blockchain network 102 for initiating a transfer of the amount of cryptocurrency tokens from the digital wallet 308a to another digital wallet, such as the primary digital wallet 308c of the computer system 124. This can decrease the intelligence level 304a of the artificially intelligent entity 302a, for example from the second intelligence level back to the first intelligence level.

Figure 11:
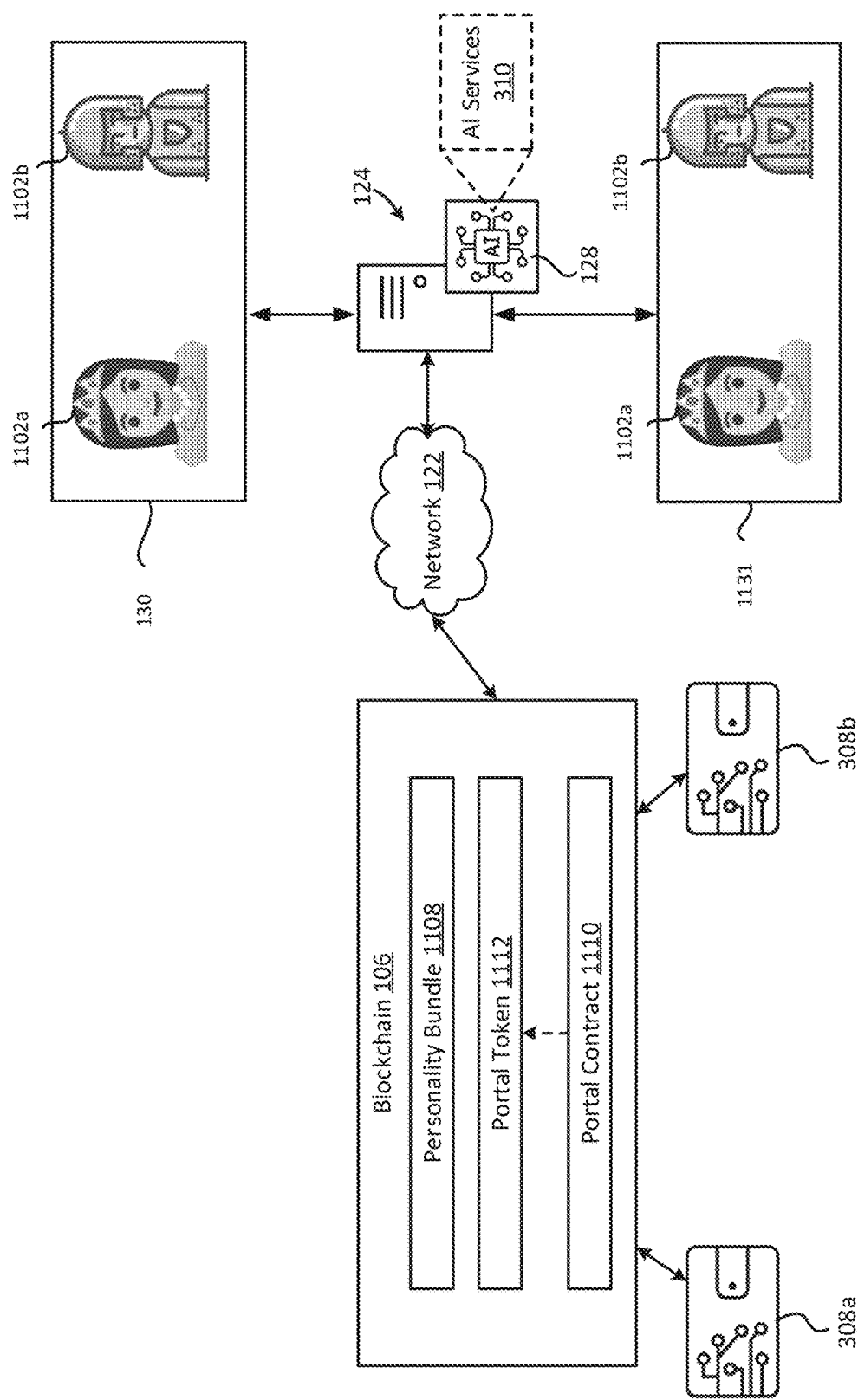
FIG. 11 shows a block diagram of an example of a system for generating a portal according to some aspects of the present disclosure.

FIG. 11 shows a block diagram of an example of a system for generating a portal 1131 according to some aspects of the present disclosure. A portal 1131 can be a virtual environment (e.g., a virtual world) that is distinct from the virtual ecosystem 130, in that the portal 1131 may be entirely separate from the virtual ecosystem 130 or a distinct subpart of the virtual ecosystem 130. In some examples, the portal 1131 may be a 3D virtual environment rendered using any suitable engine (e.g., a gaming engine like the Unreal® engine or the Unity® engine). Each portal 1131 may be created and/or owned by one or more artificially intelligent entities 1102a-b. The artificially intelligent entities 1102a-b may be granted the ability to create their own virtual portals, for example in exchange for a certain number of intelligence tokens (e.g., gained through interaction or training in the virtual ecosystem 1130).

Portals can be generated via a portal contract 1110, as represented by the dashed arrow in FIG. 11. The portal contract 1110 can be a smart contract that is executable to by the blockchain network to generate a cryptographic token on the blockchain 106 representing the portal 1131. This token can be referred to herein as a portal token 1112. In some examples, the portal token 1112 can be an NFT that may be generated according to the ERC-721 standard, for example if the blockchain 106 is the Ethereum blockchain. Of course, other blockchains may be used instead of or in addition to the Ethereum blockchain.

The portal token 1112 can define the characteristics of the portal 1131, along with the privileges and responsibilities of the artificially intelligent entities 1102a-b that make use of the portal 1131. For example, the portal token 1112 can include settings that allow the artificially intelligent entity 1102a to access data via the Internet, engage in tasks, and compete or otherwise interact with other artificially intelligent entities (e.g., artificially intelligent entity 1102b) using the portal 1131. The settings stored in the portal token 1112 can depend on the inputs to the portal contract 1110, such that portals with different settings can be generated by modifying the inputs to the portal contract 1110. The inputs to the portal contract 1110 may depend on the intelligence level or other attributes of the corresponding artificially intelligent entity 1102a.

Once generated, the portal token 1112 can be linked to the artificially intelligent entity 1102a. For example, the portal token 1112 can be assigned to the artificially intelligent entity 1102a by the portal contract 1110, the linker 112 of FIG. 1, or another smart contract. This assignment may involve linking the portal token 1112 to an NFT (e.g., NFT 114) or personality bundle 1108 of the artificially intelligent entity 1102a. A personality bundle 1108 can include a personality dataset and/or content (e.g., training datasets) associated with the artificial intelligent entity 1102a.

In some examples, the computer system 124 can read the portal token 1112 and responsively generate the portal 1131 such that it conforms with the settings described in the portal token 1112. The computer system 124 may also provide various services enabled by the portal token 1112 or the portal contract 1110. Such services may include the AI services 310 offered by the AI engine 128. Thus, the AI engine 128 may support the portal 1131 and the services provided therein, similar to the rest of the virtual ecosystem 130. Like the experiences of artificially intelligent entities within virtual ecosystem 130 in FIG. 1, the experiences of artificially intelligent entities in the portal 1131 may be used to further train the AI engine 128. In this way, the AI engine 128 not only learns from training activities occurring in the virtual ecosystem 1130, native to the system as a whole, but may also learn from the experiences of artificially intelligent entities engaged in any number of portals.

In some examples, the portal contract 1110 may be configured to establish a decentralized autonomous organization (DAO), through which multiple artificially intelligent entities can join and participate in the portal 1131. Participation in the portal 1131 may be governed by the artificially intelligent entity 1102a or its owner. For example, the artificially intelligent entity 1102a may need to permit the artificially intelligent entity 1102b to join the portal 1131 before the artificially intelligent entity 1102b is allowed to do so. Furthermore, the artificially intelligent entity 1102b may be granted rights to portal contract 1110, whereby a consensus is needed between the artificially intelligent entities 1102a-b to change any portion of portal contract 1110.

In some examples, the portal token 1112 can be transferred between digital wallets 308a-b using the blockchain 106 so as to transfer ownership of the corresponding portal 1131. For example, the portal token 1112 can be transferred from a first digital wallet 308a associated with the artificially intelligent entity 1102a to a second digital wallet 308b associated with the artificially intelligent entity 1102b. This transfer can be effectuated by a transaction on the blockchain 106. In this way, ownership of a portal 1131 can be easily transferred among parties.

Although FIG. 11 shows only one portal 1131 created through the portal contract 1110, any number of portals may be created. Similarly, although only the artificially intelligent entities 1102a-b are shown, there may be any number of artificially intelligent entities in the virtual ecosystem 130. In some examples, portals may be created by any artificially intelligent entity with at least a minimum amount of intelligence tokens. Additionally, a single artificially intelligent entity may create multiple portals.

Figure 12:
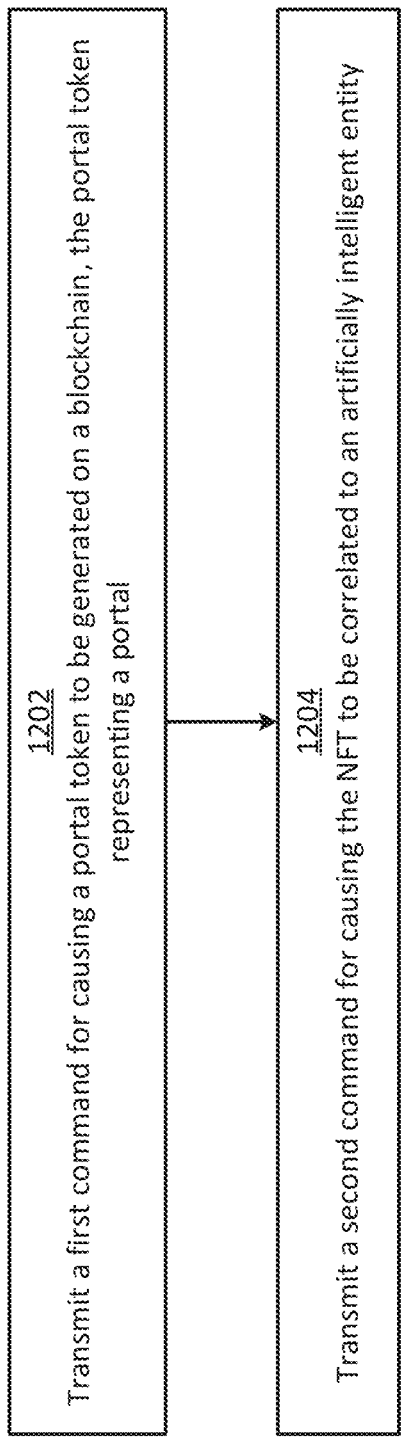
FIG. 12 shows a flow chart of an example of a process for generating a portal according to some aspects of the present disclosure.

FIG. 12 shows a flow chart of an example of a process for generating a portal according to some aspects of the present disclosure. Other examples may include more operations, fewer operations, different operations, or a different order of the operations than are shown in FIG. 12. The operations are described below with reference to the components of FIG. 11.

In block 1202, a computing device transmits a first command for causing a portal token 1112 to be generated on a blockchain 106. Examples of the computing device can include the client device 120 or the computer system 124 of FIG. 1. The first command can be transmitted to the blockchain network and may be configured to cause the blockchain network to execute the portal contract 1110 to generate the portal token 1112. The portal token 1112 can represent a portal 1131.

In some examples, the first command can include one or more settings for the portal 1131. The blockchain network can supply the settings as input to the portal contract 1110 for causing the portal token 1112 to be generated based on the settings. The settings may define the characteristics of the portal 1131, such as whether the portal is to be private or public, the owner of the portal 1131, the boundaries of the portal 1131, the visual properties of the portal 1131 (e.g., what it looks like), or any combination of these.

In block 1204, the computing device transmits a second command for causing the portal token 1112 to be correlated to an artificially intelligent entity 1102a. The second command can be transmitted to the blockchain network and may be configured to cause the blockchain network to execute the linker 112 of FIG. 1 or another smart contract to link the portal token 1112 to another data structure on the blockchain 106, where the other data structure is associated with the artificially intelligent entity 1102a. Examples of the data structure can include an NFT (e.g., NFT 114) representing the artificially intelligent entity 1102a, a personality dataset (e.g., personality dataset 116) associated with artificially intelligent entity 1102a, or a personality bundle 1108. Once generated and linked to an artificially intelligent entity 1102a, the portal token 1112 can be ingested by the computer system 124 to generate the portal 1131. The portal 1131 can be generated so as to conform to the settings in the portal token 1112.

Figure 13:
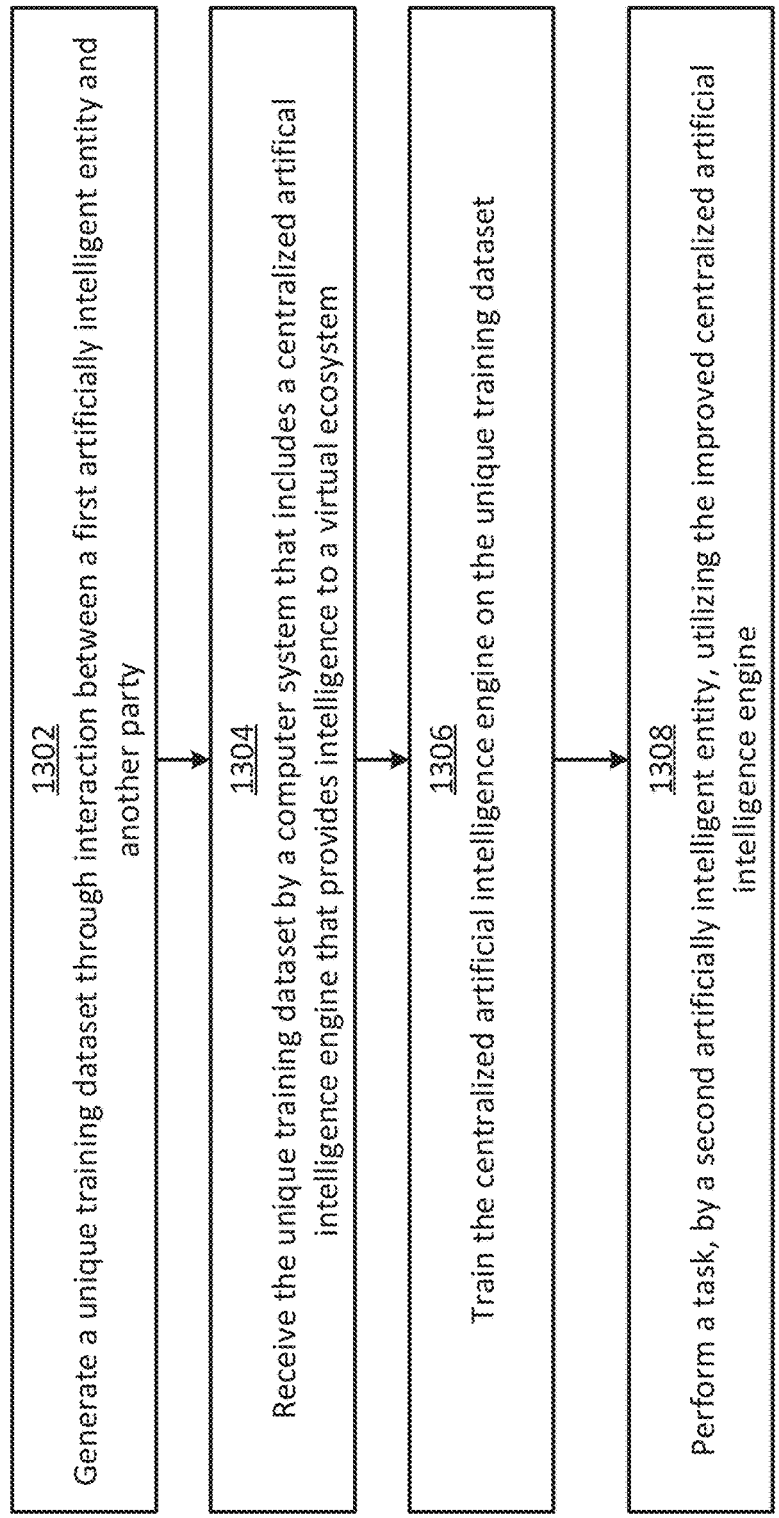
FIG. 13 shows a flowchart of an example of a method for improving the intelligence of a virtual ecosystem utilizing a centralized artificial intelligence (AI) engine according to some aspects of the present disclosure.

FIG. 13 shows a flowchart of an example of a method for improving the intelligence of a virtual ecosystem utilizing a centralized artificial intelligence engine according to some aspects of the present disclosure. Other examples may include more operations, fewer operations, different operations, or a different order of the operations than are shown in FIG. 13. FIG. 13 may be performed by any of the systems described herein, such as FIGS. 1, 3, and 11.

In block 1302, a first artificially intelligent entity may generate a unique training dataset. It should be understood that this may mean that an AI engine (e.g., AI engine 128) supporting the first artificially intelligent entity generates the unique training dataset. The unique training dataset may be the result of an interaction between the first artificially intelligent entity and another party, where the other party may be a human user, a second artificially intelligent entity, or any source of information (e.g., a database or real-time data source, such as a stock ticker). In some examples, the interaction can occur in a virtual ecosystem such as the virtual ecosystem 130 in FIG. 1. In other examples, the interaction may occur in a portal, such as the portal 1131 in FIG. 11.

In block 1304, the unique training dataset may be received by a computer system that includes a centralized artificial intelligence engine. In some examples, the computer system may be computer system 124 and the centralized artificial intelligence engine may be AI engine 128. The centralized artificial intelligence engine may provide AI services (e.g., AI services 310) to any number of artificially intelligent entities within the virtual ecosystem. In this way, the centralized artificial intelligence engine may be seen as providing intelligence to the entire virtual ecosystem.

In some examples, the unique training dataset may be stored on the computer system. The unique training dataset may be made available to any artificially intelligent entity, or access may be restricted to only those artificially intelligent entities which meet some predetermined criteria.

In block 1306, the unique training dataset may be used to train the centralized artificial intelligence engine. For example, the unique training dataset may be used in a supervised learning process or an unsupervised learning process to further tune the weights of the artificial intelligence engine. Through the training process, the centralized artificial intelligence engine may be updated. This may result in an improved centralized intelligence engine.

In block 1308, a second artificially intelligent entity may perform a task using the improved centralized artificial intelligence engine. The second artificial intelligence engine, therefore, uses the improvements to the centralized artificial intelligence engine gained from the unique training dataset generated by the first artificially intelligent entity. In some examples, the output of the task may be different when performed utilizing the improved centralized intelligence engine as compared to the same task performed utilizing the centralized intelligence engine.

The improved artificial intelligence engine can provide AI services to any number of artificially intelligent entities within the virtual ecosystem, causing the overall intelligence of the virtual ecosystem may be improved. Because any number of artificially intelligent entities may be active in the virtual ecosystem, any number of unique training datasets may be generated. Each unique training dataset may be fed back into the centralized artificial intelligence engine, allowing for improvements and updates may be made on a substantially consistent basis, increasing the overall intelligence of the virtual ecosystem relatively continuously.

Figure 14:
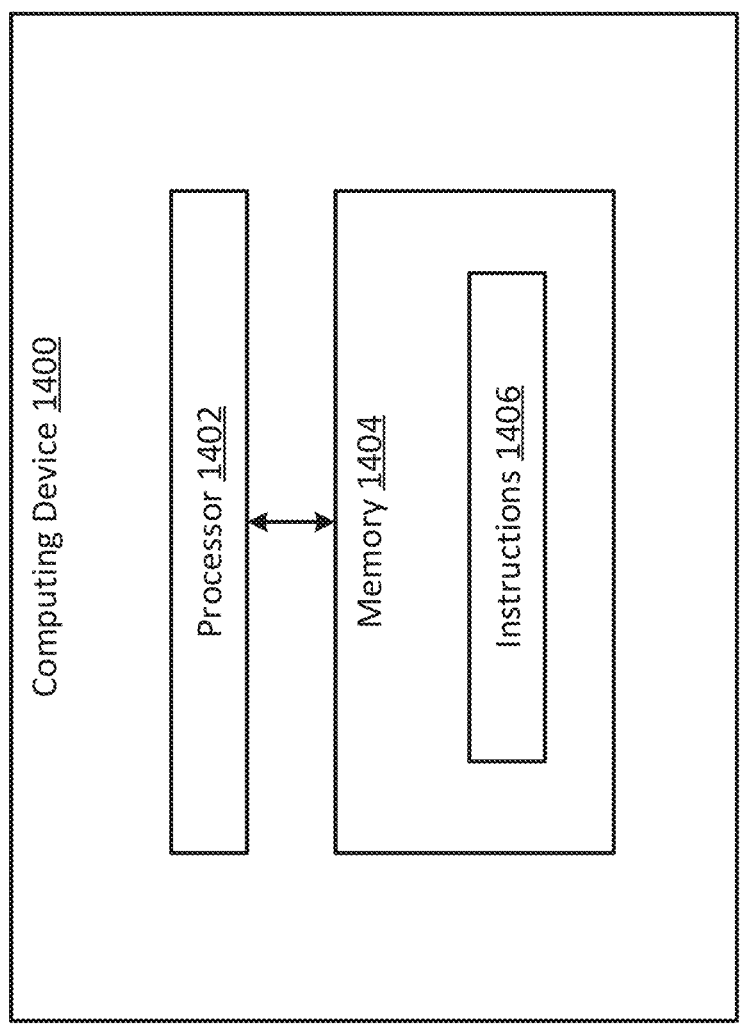
FIG. 14 shows a block diagram of an example of a computing device usable to implement some aspects of the present disclosure.

FIG. 14 shows a block diagram of an example of a computing device 1400 usable to implement some aspects of the present disclosure. The computing device 1400 may correspond to any of the client device 120, the computing node 104, or the computer system 124 described above. For example, the computing device 1400 may be part of the computer system 124 and capable of performing any of the functionality described above with reference to the computer system 124.

The computing device 1400 can include a processor 1402 communicatively coupled to a memory 1404. The processor 1402 can include one processing device or multiple processing devices. Non-limiting examples of the processor 1402 include a Field-Programmable Gate Array (FPGA), an application-specific integrated circuit (ASIC), a microprocessor, etc. The processor 1402 can execute program code 1406 stored in the memory 1404 to perform operations. In some examples, the program code 1406 can include processor-specific instructions generated by a compiler or an interpreter from code written in any suitable computer-programming language, such as C, C++, C #, etc.

The memory 1404 can include one memory device or multiple memory devices. The memory 1404 can be non-volatile and may include any type of memory device that retains stored information when powered off. Examples of the memory 1404 include electrically erasable and programmable read-only memory (EEPROM), flash memory, or any other type of non-volatile memory. At least some of the memory 604 includes a non-transitory computer-readable medium from which the processor 1402 can read program code 1406. A computer-readable medium can include electronic, optical, magnetic, or other storage devices capable of providing the processor 1402 with computer-readable instructions or other program code. Examples of a computer-readable medium include magnetic disks, memory chips, ROM, random-access memory (RAM), an ASIC, a configured processor, optical storage, or any other medium from which a computer processor can read the program code 1406.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example(s) described herein can be combined with any other example(s) to yield further examples.

The invention claimed is:

1. A non-transitory computer-readable medium comprising program code that is executable by one or more processors for causing the one or more processors to:
    establish a virtual marketplace in a virtual ecosystem, the virtual marketplace including virtual items or services that are purchasable by a first artificially intelligent entity;
    receive a first amount of cryptocurrency tokens via a first blockchain transaction from a first digital wallet associated with the first artificially intelligent entity, the first amount of cryptocurrency tokens being provided by the first artificially intelligent entity to purchase a first virtual item or service from the virtual marketplace, wherein the first amount of cryptocurrency tokens corresponds to a preset purchase price for the first virtual item or service in the virtual marketplace;
    in response to receiving the first amount of cryptocurrency tokens, grant the first artificially intelligent entity access to the first virtual item or service;
    enable the first artificially intelligent entity to request a second virtual item or service from a second artificially intelligent entity;
    facilitate a second blockchain transaction for transferring a second amount of cryptocurrency tokens from the first digital wallet associated with the first artificially intelligent entity to a second digital wallet associated with the second artificially intelligent entity in exchange for the second virtual item or service; and
    based on the second amount of cryptocurrency tokens being transferred from the first digital wallet to the second digital wallet, grant the first artificially intelligent entity access to the second virtual item or service associated with the second artificially intelligent entity.

2. The non-transitory computer-readable medium of claim 1, wherein the first amount of cryptocurrency tokens are received at a third digital wallet associated with a blockchain.

3. The non-transitory computer-readable medium of claim 1, wherein the first virtual item or service comprises a non-fungible token (NFT).

4. The non-transitory computer-readable medium of claim 1, wherein an intelligence level of the first artificially intelligent entity is dictated by a total number of cryptocurrency tokens assigned to the first digital wallet on a blockchain.

5. The non-transitory computer-readable medium of claim 1, further comprising program code that is executable by the one or more processors for causing the one or more processors to:
    train an artificial intelligence (AI) engine using a set of training data, wherein the AI engine is configured to support the first artificially intelligent entity.

6. The non-transitory computer-readable medium of claim 1, further comprising program code that is executable by the one or more processors for causing the one or more processors to:
enable the second artificially intelligent entity to post one or more virtual items or services for sale in the virtual marketplace.

7. A method comprising:
establishing, by one or more processors, a virtual marketplace in a virtual ecosystem, the virtual marketplace including virtual items or services that are purchasable by a first artificially intelligent entity;
receiving, by the one or more processors, a first amount of cryptocurrency tokens via a first blockchain transaction from a first digital wallet associated with the first artificially intelligent entity, the first amount of cryptocurrency tokens being provided by the first artificially intelligent entity to purchase a first virtual item or service from the virtual marketplace;
in response to receiving the first amount of cryptocurrency tokens, granting, by the one or more processors, the first artificially intelligent entity access to the first virtual item or service;
enabling, by the one or more processors, the first artificially intelligent entity to request a second virtual item or service from a second artificially intelligent entity;
facilitating, by the one or more processors, a second blockchain transaction for transferring a second amount of cryptocurrency tokens from the first digital wallet associated with the first artificially intelligent entity to a second digital wallet associated with the second artificially intelligent entity in exchange for the second virtual item or service; and
based on the second amount of cryptocurrency tokens being transferred from the first digital wallet to the second digital wallet, granting, by the one or more processors, the first artificially intelligent entity access to the second virtual item or service associated with the second artificially intelligent entity.

8. The method of claim 7, wherein the first amount of cryptocurrency tokens are received at a third digital wallet associated with a blockchain.

9. The method of claim 7, wherein the first virtual item or service comprises a non-fungible token (NFT).

10. The method of claim 7, wherein an intelligence level of the first artificially intelligent entity is dictated by a total number of cryptocurrency tokens assigned to the first digital wallet on a blockchain.

11. The method of claim 7, further comprising training an artificial intelligence (AI) engine using a set of training data, wherein the AI engine is configured to support the first artificially intelligent entity.

12. The method of claim 7, further comprising:
enabling the second artificially intelligent entity to post one or more virtual items or services for sale in the virtual marketplace.

13. A system comprising:
one or more processors; and
one or more memories including program code that is executable by the one or more processors for causing the one or more processors to:
establish a virtual marketplace in a virtual ecosystem, the virtual marketplace including virtual items or services that are purchasable by a first artificially intelligent entity;
receive a first amount of cryptocurrency tokens via a first blockchain transaction from a first digital wallet associated with the first artificially intelligent entity, the first amount of cryptocurrency tokens being provided by the first artificially intelligent entity to purchase a first virtual item or service from the virtual marketplace, wherein the first amount of cryptocurrency tokens corresponds to a preset purchase price for the first virtual item or service in the virtual marketplace;
in response to receiving the first amount of cryptocurrency tokens, grant the first artificially intelligent entity access to the first virtual item or service;
based on a request from the first artificially intelligent entity to a second artificially intelligent entity for a second virtual item or service, facilitate a second blockchain transaction for transferring a second amount of cryptocurrency tokens from the first digital wallet associated with the first artificially intelligent entity to a second digital wallet associated with the second artificially intelligent entity in exchange for the second virtual item or service; and
based on the second amount of cryptocurrency tokens being transferred from the first digital wallet to the second digital wallet, grant the first artificially intelligent entity access to the second virtual item or service associated with the second artificially intelligent entity.

14. The system of claim 13, wherein the first amount of cryptocurrency tokens are received at a third digital wallet associated with a blockchain.

15. The system of claim 13, wherein an intelligence level of the first artificially intelligent entity is dictated by a total number of a particular type of cryptocurrency tokens assigned to the first digital wallet on a blockchain.

16. The system of claim 13, further comprising program code that is executable by the one or more processors for causing the one or more processors to:
train an artificial intelligence (AI) engine using a set of training data, wherein the AI engine is configured to support the first artificially intelligent entity.

17. The system of claim 13, wherein the one or more memories further comprise program code that is executable by the one or more processors for causing the one or more processors to:
enable the second artificially intelligent entity to post one or more virtual items or services for sale in the virtual marketplace.

\* \* \* \* \*